United States Patent
Childs et al.

(10) Patent No.: US 7,269,508 B1
(45) Date of Patent: *Sep. 11, 2007

(54) GUIDANCE WITH FEATURE ACCOUNTING FOR INSIGNIFICANT ROADS

(75) Inventors: Michael Childs, Olathe, KS (US); Darin J. Beesley, Overland Park, KS (US)

(73) Assignee: Garmin Ltd. (KY)

( * ) Notice: Subject to any disclaimer, the term of this patent is extended or adjusted under 35 U.S.C. 154(b) by 466 days.

This patent is subject to a terminal disclaimer.

(21) Appl. No.: 10/976,998

(22) Filed: Oct. 29, 2004

Related U.S. Application Data

(63) Continuation of application No. 10/032,196, filed on Dec. 21, 2001, now Pat. No. 6,847,890.

(51) Int. Cl.
*G01C 21/30* (2006.01)
(52) U.S. Cl. .................................... 701/211
(58) Field of Classification Search ................. 701/211
See application file for complete search history.

(56) References Cited

U.S. PATENT DOCUMENTS

| | | | |
|---|---|---|---|
| 3,660,812 A | 5/1972 | Inose et al. | |
| 3,883,847 A | 5/1975 | Frank | |
| 4,811,613 A | 3/1989 | Phillips et al. | |
| 4,827,419 A | 5/1989 | Selby | |
| 4,831,563 A | 5/1989 | Ando et al. | |
| 4,924,402 A | 5/1990 | Ando et al. | |
| 4,926,336 A | 5/1990 | Yamada | |
| 4,937,753 A | 6/1990 | Yamada | |
| 5,208,593 A | 5/1993 | Tong et al. | |
| 5,220,509 A | 6/1993 | Takemura et al. | |
| 5,243,529 A | 9/1993 | Kashiwazaki | |
| 5,272,638 A | 12/1993 | Martin et al. | |
| 5,297,051 A | 3/1994 | Arakawa et al. | |
| 5,331,563 A | 7/1994 | Masumoto et al. | |
| 5,343,399 A | 8/1994 | Yokoyama et al. | |
| 5,349,530 A | 9/1994 | Odagawa | |
| 5,363,306 A | 11/1994 | Kuwahara et al. | |

(Continued)

FOREIGN PATENT DOCUMENTS

CN    1391687 T    10/2003

(Continued)

OTHER PUBLICATIONS

"An optimal pathfinder for vehicles in real-world digital terrain maps", http://www.nease.net/jamsoft/shortestpath/pathfinder/4.html, 11 pages (1999).

(Continued)

*Primary Examiner*—Thu V. Nguyen
(74) *Attorney, Agent, or Firm*—David L. Terrell

(57) ABSTRACT

Systems, devices and methods are provided to account for insignificant route segments to enhance a route guidance experience. An electronic navigational aid device is provided according to one aspect. The device includes a processor and a memory adapted to communicate with the processor. The processor and memory are adapted to cooperate to provide route guidance that accounts for insignificant route segments. According to various embodiments, insignificant route segments are accounted for by nullifying and/or modifying route guidance maneuvers associated with the insignificant route segments. Other aspects are provided herein.

19 Claims, 11 Drawing Sheets

U.S. PATENT DOCUMENTS

| | | | |
|---|---|---|---|
| 5,365,448 A | 11/1994 | Nobe et al. | |
| 5,371,497 A | 12/1994 | Nimura et al. | |
| 5,396,430 A | 3/1995 | Arakawa et al. | |
| 5,410,486 A | 4/1995 | Kishi | |
| 5,422,815 A | 6/1995 | Hijikata | |
| 5,424,953 A | 6/1995 | Masumoto et al. | |
| 5,442,559 A | 8/1995 | Kuwahara et al. | |
| 5,452,212 A | 9/1995 | Yokoyama et al. | 364/449 |
| 5,452,217 A | 9/1995 | Kishi | |
| 5,463,554 A | 10/1995 | Araki et al. | |
| 5,475,599 A | 12/1995 | Yokoyama | |
| 5,506,578 A | 4/1996 | Kishi | |
| 5,506,774 A | 4/1996 | Nobe et al. | |
| 5,528,248 A | 6/1996 | Steiner et al. | 342/357 |
| 5,537,323 A | 7/1996 | Schulte | 364/449 |
| 5,537,324 A | 7/1996 | Nimura et al. | |
| 5,546,107 A | 8/1996 | Deretsky et al. | |
| 5,559,511 A | 9/1996 | Ito et al. | |
| 5,627,547 A | 5/1997 | Ramaswamy et al. | |
| 5,638,279 A | 6/1997 | Kishi et al. | |
| 5,652,706 A | 7/1997 | Morimoto et al. | |
| 5,657,231 A | 8/1997 | Nobe et al. | |
| 5,659,476 A | 8/1997 | LeFebvre et al. | |
| 5,682,525 A | 10/1997 | Bouve et al. | |
| 5,712,788 A | 1/1998 | Liaw et al. | |
| 5,729,109 A | 3/1998 | Kaneko et al. | |
| 5,729,458 A | 3/1998 | Poppen | |
| 5,739,772 A | 4/1998 | Nanba et al. | |
| 5,742,925 A | 4/1998 | Baba | |
| 5,757,289 A | 5/1998 | Nimura et al. | |
| 5,757,359 A | 5/1998 | Morimoto et al. | |
| 5,774,073 A | 6/1998 | Maekawa et al. | |
| 5,774,828 A | 6/1998 | Brunts et al. | |
| 5,787,383 A | 7/1998 | Moroto et al. | |
| 5,793,631 A | 8/1998 | Ito | |
| 5,809,447 A | 9/1998 | Kato | |
| 5,821,887 A | 10/1998 | Zhu | |
| 5,845,282 A | 12/1998 | Alley et al. | |
| 5,852,791 A | 12/1998 | Sato et al. | |
| 5,857,196 A | 1/1999 | Angle et al. | |
| 5,862,511 A | 1/1999 | Croyle et al. | |
| 5,874,905 A | 2/1999 | Nanba et al. | |
| 5,877,751 A | 3/1999 | Kanemitsu et al. | |
| 5,878,368 A | 3/1999 | DeGraaf | |
| 5,887,269 A | 3/1999 | Brunts et al. | |
| 5,890,092 A | 3/1999 | Kato et al. | |
| 5,893,081 A | 4/1999 | Poppen | |
| 5,902,349 A | 5/1999 | Endo et al. | |
| 5,911,773 A | 6/1999 | Mutsuga et al. | |
| 5,925,090 A | 7/1999 | Poonsaengsathit | |
| 5,926,118 A | 7/1999 | Hayashida et al. | |
| 5,938,721 A | 8/1999 | Dussell et al. | 701/211 |
| 5,946,687 A | 8/1999 | Gehani et al. | |
| 5,946,962 A | 9/1999 | Faloutsos et al. | |
| 5,951,622 A | 9/1999 | Nomura | |
| 5,953,722 A | 9/1999 | Lampert et al. | |
| 5,964,821 A | 10/1999 | Brunts et al. | |
| 5,968,109 A | 10/1999 | Israni et al. | |
| 5,977,885 A | 11/1999 | Watanabe | 340/995 |
| 5,978,730 A | 11/1999 | Poppen et al. | |
| 5,987,377 A | 11/1999 | Westerlage et al. | |
| 5,995,970 A | 11/1999 | Robinson et al. | |
| 6,016,485 A | 1/2000 | Amakawa et al. | |
| 6,021,406 A | 2/2000 | Kuznetsov | |
| 6,023,655 A | 2/2000 | Nomura | |
| 6,032,219 A | 2/2000 | Robinson et al. | |
| 6,035,299 A | 3/2000 | White et al. | |
| 6,038,509 A | 3/2000 | Poppen et al. | |
| 6,038,559 A | 3/2000 | Ashby et al. | |
| 6,040,824 A | 3/2000 | Maekawa et al. | |
| 6,047,280 A | 4/2000 | Ashby et al. | |
| 6,052,645 A | 4/2000 | Harada | |
| 6,061,003 A | 5/2000 | Harada | |
| 6,061,630 A | 5/2000 | Walgers et al. | |
| 6,064,941 A | 5/2000 | Nimura et al. | |
| 6,073,076 A | 6/2000 | Crowley et al. | |
| 6,076,041 A | 6/2000 | Watanabe | |
| 6,081,803 A | 6/2000 | Ashby et al. | |
| 6,088,652 A | 7/2000 | Abe | |
| 6,101,443 A | 8/2000 | Kato et al. | |
| 6,108,603 A | 8/2000 | Karunanidhi | |
| 6,108,604 A | 8/2000 | Fukaya et al. | |
| 6,112,153 A | 8/2000 | Schaaf et al. | |
| 6,112,200 A | 8/2000 | Livshutz et al. | |
| 6,119,066 A | 9/2000 | Sugiura et al. | |
| 6,121,314 A | 9/2000 | Richter et al. | |
| 6,121,900 A | 9/2000 | Takishita | |
| 6,122,593 A | 9/2000 | Friederich et al. | |
| 6,128,515 A | 10/2000 | Kabler et al. | |
| 6,128,573 A | 10/2000 | Nomura | |
| 6,132,391 A | 10/2000 | Onari et al. | |
| 6,134,501 A | 10/2000 | Oumi | |
| 6,144,917 A | 11/2000 | Walters et al. | |
| 6,151,552 A | 11/2000 | Koizumi et al. | |
| 6,161,092 A | 12/2000 | Latshaw | |
| 6,169,956 B1 | 1/2001 | Morimoto et al. | |
| 6,172,641 B1 | 1/2001 | Millington | |
| 6,182,006 B1 | 1/2001 | Meek | |
| 6,182,010 B1 | 1/2001 | Berstis | |
| 6,184,823 B1 | 2/2001 | Smith et al. | |
| 6,188,955 B1 | 2/2001 | Robinson et al. | |
| 6,192,314 B1 | 2/2001 | Khavakh et al. | |
| 6,199,013 B1 | 3/2001 | O'Shea | 701/211 |
| 6,199,045 B1 | 3/2001 | Giniger et al. | |
| 6,202,024 B1 | 3/2001 | Yokoyama et al. | |
| 6,202,026 B1 | 3/2001 | Nimura et al. | |
| 6,219,457 B1 | 4/2001 | Potu | |
| 6,222,485 B1 | 4/2001 | Walters et al. | |
| 6,226,591 B1 | 5/2001 | Okumura et al. | |
| 6,249,740 B1 | 6/2001 | Ito et al. | |
| 6,249,744 B1 | 6/2001 | Morita | |
| 6,252,605 B1 | 6/2001 | Beesley et al. | |
| 6,256,351 B1 | 7/2001 | Hong | |
| 6,259,988 B1 | 7/2001 | Galkowski et al. | |
| 6,263,276 B1 | 7/2001 | Yokoyama et al. | |
| 6,263,277 B1 | 7/2001 | Tanimoto et al. | |
| 6,266,612 B1 | 7/2001 | Dussell et al. | 701/207 |
| 6,266,615 B1 | 7/2001 | Jin | |
| 6,278,994 B1 | 8/2001 | Fuh et al. | |
| 6,285,950 B1 | 9/2001 | Tanimoto | |
| 6,285,951 B1 | 9/2001 | Gaskins et al. | |
| 6,292,743 B1 | 9/2001 | Pu et al. | |
| 6,298,303 B1 | 10/2001 | Khavakh et al. | |
| 6,298,305 B1 | 10/2001 | Kadaba et al. | |
| 6,307,573 B1 | 10/2001 | Barros | |
| 6,308,177 B1 | 10/2001 | Israni et al. | |
| 6,314,365 B1 | 11/2001 | Smith | |
| 6,317,684 B1 | 11/2001 | Roeseler et al. | 701/202 |
| 6,317,687 B1 | 11/2001 | Morimoto et al. | 701/211 |
| 6,321,158 B1 | 11/2001 | DeLorme et al. | 701/201 |
| 6,324,467 B1 | 11/2001 | Machii et al. | |
| 6,347,278 B2 | 2/2002 | Ito | |
| 6,349,257 B1 | 2/2002 | Liu et al. | |
| 6,360,167 B1 | 3/2002 | Millington et al. | |
| 6,362,778 B2 | 3/2002 | Neher | |
| 6,374,177 B1 | 4/2002 | Lee et al. | |
| 6,374,179 B1 | 4/2002 | Smith et al. | |
| 6,381,535 B1 | 4/2002 | Durocher et al. | |
| 6,388,877 B1 | 5/2002 | Canova, Jr. et al. | |
| 6,393,149 B2 | 5/2002 | Friederich et al. | |
| 6,401,034 B1 | 6/2002 | Kaplan et al. | |
| 6,401,035 B2 | 6/2002 | Jin | |
| 6,405,123 B1 | 6/2002 | Rennard et al. | |
| 6,411,899 B2 | 6/2002 | Dussell et al. | 701/211 |

| | | |
|---|---|---|
| 6,427,119 B1 | 7/2002 | Stefan et al. |
| 6,430,498 B1 | 8/2002 | Maruyama et al. |
| 6,456,234 B1 | 9/2002 | Johnson |
| 6,456,938 B1 | 9/2002 | Barnard |
| 6,459,987 B1 | 10/2002 | Krull et al. |
| 6,460,046 B1 | 10/2002 | Meek |
| 6,477,464 B2 | 11/2002 | McCarthy et al. |
| 6,477,526 B2 | 11/2002 | Hayashi et al. |
| 6,484,093 B1 | 11/2002 | Ito et al. |
| 6,487,494 B2 | 11/2002 | Odinak et al. |
| 6,504,496 B1 | 1/2003 | Mesarovic et al. |
| 6,505,123 B1 | 1/2003 | Root et al. |
| 6,510,379 B1 | 1/2003 | Hasegawa et al. ......... 701/202 |
| 6,512,525 B1 | 1/2003 | Capps et al. |
| 6,522,875 B1 | 2/2003 | Dowling et al. |
| 6,526,351 B2 | 2/2003 | Whitham |
| 6,532,152 B1 | 3/2003 | White et al. |
| 6,535,743 B1 | 3/2003 | Kennedy et al. |
| 6,542,814 B2 | 4/2003 | Polidi et al. |
| 6,545,637 B1 | 4/2003 | Krull et al. |
| 6,563,440 B1 | 5/2003 | Kangas |
| 6,567,743 B1 | 5/2003 | Mueller et al. |
| 6,574,553 B1 | 6/2003 | Beesley et al. |
| 6,574,554 B1 | 6/2003 | Beesley et al. |
| 6,581,003 B1 | 6/2003 | Childs et al. |
| 6,594,666 B1 | 7/2003 | Biswas et al. |
| 6,615,130 B2 | 9/2003 | Myr |
| 6,615,131 B1 | 9/2003 | Rennard et al. |
| 6,633,809 B1 | 10/2003 | Aizono et al. |
| 6,647,337 B1 | 11/2003 | Childs et al. |
| 6,650,996 B1 | 11/2003 | Beesley et al. |
| 6,650,997 B2 | 11/2003 | Funk |
| 6,674,445 B1 | 1/2004 | Chithambaram et al. |
| 6,674,849 B1 | 1/2004 | Froeberg |
| 6,675,093 B1 | 1/2004 | Childs et al. |
| 6,681,176 B2 | 1/2004 | Funk et al. |
| 6,694,256 B1 | 2/2004 | Childs et al. |
| 6,704,645 B1 | 3/2004 | Beesley et al. |
| 6,708,112 B1 | 3/2004 | Beesley et al. |
| 6,725,155 B1 | 4/2004 | Takahashi et al. |
| 6,768,942 B1 | 7/2004 | Chojnacki |
| 6,775,612 B1 | 8/2004 | Kao et al. |
| 6,782,318 B1 | 8/2004 | Beesley et al. |
| 6,789,012 B1 | 9/2004 | Childs et al. |
| 6,799,115 B1 | 9/2004 | Childs et al. |
| 6,807,483 B1 | 10/2004 | Chao et al. |
| 6,823,256 B1 | 11/2004 | Burt |
| 6,834,230 B1 | 12/2004 | Childs et al. |
| 6,839,624 B1 | 1/2005 | Beesley et al. |
| 6,845,322 B1 | 1/2005 | Chao et al. |
| 6,847,884 B1 | 1/2005 | Childs et al. |
| 6,847,890 B1 | 1/2005 | Childs et al. |
| 6,850,842 B2 | 2/2005 | Park |
| 6,856,893 B2 | 2/2005 | Beesley et al. |
| 6,856,899 B2 | 2/2005 | Krull et al. |
| 6,858,900 B2 | 2/2005 | Childs et al. |
| 6,892,135 B1 | 5/2005 | Krull et al. |
| 6,898,520 B2 | 5/2005 | Kao et al. |
| 6,899,138 B2 | 5/2005 | Krull et al. |
| 6,909,965 B1 | 6/2005 | Beesley et al. |
| 6,947,838 B1 | 9/2005 | Krull et al. |
| 6,948,043 B2 | 9/2005 | Mathis |
| 6,975,940 B1 | 12/2005 | Childs et al. |
| 6,980,906 B2 | 12/2005 | Kao et al. |
| 6,987,986 B2 | 1/2006 | Boesen |
| 6,999,873 B1 | 2/2006 | Krull et al. |
| 7,043,362 B2 | 5/2006 | Krull et al. |
| 7,062,378 B2 | 6/2006 | Krull et al. |
| 7,120,539 B2 | 10/2006 | Krull |
| 7,184,886 B1 | 2/2007 | Krull et al. |
| 7,206,692 B2 | 4/2007 | Beesley et al. |
| 2001/0043745 A1 | 11/2001 | Frederich et al. |
| 2001/0045949 A1 | 11/2001 | Chithambaram et al. |
| 2001/0047242 A1 | 11/2001 | Ohta |
| 2001/0056327 A1 | 12/2001 | Jin |
| 2002/0038316 A1 | 3/2002 | Onyon et al. |
| 2002/0040271 A1 | 4/2002 | Park et al. |
| 2002/0065603 A1 | 5/2002 | Watanabe et al. |
| 2002/0068583 A1 | 6/2002 | Murray |
| 2002/0091527 A1 | 7/2002 | Shiau ................ 740/270.1 |
| 2002/0102988 A1 | 8/2002 | Myllymaki |
| 2002/0120753 A1 | 8/2002 | Levanon et al. .......... 709/228 |
| 2002/0164998 A1 | 11/2002 | Younis |
| 2002/0169549 A1 | 11/2002 | Kaplan |
| 2002/0169778 A1 | 11/2002 | Natesan et al. |
| 2002/0173905 A1 | 11/2002 | Jin |
| 2003/0006913 A1 | 1/2003 | Joyce et al. |
| 2003/0006918 A1 | 1/2003 | Barnett |
| 2003/0013483 A1 | 1/2003 | Ausems et al. |
| 2003/0033176 A1 | 2/2003 | Hancock |
| 2003/0045301 A1 | 3/2003 | Wollrab |
| 2003/0045998 A1 | 3/2003 | Medl |
| 2003/0048599 A1 | 3/2003 | Martin |
| 2003/0069029 A1 | 4/2003 | Dowling et al. |
| 2003/0069899 A1 | 4/2003 | Brown et al. |
| 2003/0105845 A1 | 6/2003 | Leermakers |
| 2003/0124974 A1 | 7/2003 | Asami |
| 2003/0131023 A1 | 7/2003 | Bassett et al. |
| 2003/0131059 A1 | 7/2003 | Brown et al. |
| 2003/0139150 A1 | 7/2003 | Rodriguez et al. ......... 455/90.1 |
| 2003/0172044 A1 | 9/2003 | ShamRao |
| 2004/0192329 A1 | 9/2004 | Barbosa et al. |
| 2004/0220726 A1 | 11/2004 | Jin |
| 2005/0089213 A1 | 4/2005 | Geng |

FOREIGN PATENT DOCUMENTS

| | | |
|---|---|---|
| EP | 0061674 | 6/1982 |
| EP | 0123562 | 4/1984 |
| EP | 0242099 | 10/1987 |
| FR | 2541801 | 2/1983 |
| FR | 2818414 | 6/2002 |
| JP | 08-221694 | 8/1996 |
| JP | 10-132594 | 5/1998 |
| WO | 01/23839 | 4/2001 |
| WO | 02/060157 | 11/2003 |
| WO | 01/61276 | 3/2004 |
| WO | 02/103291 | 3/2004 |
| WO | 03/058170 | 10/2004 |

OTHER PUBLICATIONS

"Informed Search Method", *Artificial Intelligence, A Modern Approach*, Prentice Hall, Inc., pp. 92-115 (1995).

"Real-Time Vehicle Routing in Dynamic and Stochastic Urban Traffic Networks" http://www.gpu.srv.ualberta.ca/lfu/research.htm, pp. 1-3 (1997).

Ahuja, R., et al., "Faster Algorithms for the Shortest Path Problem", *Journal of the Association for Computing Machinery*, 37(2), pp. 213-223 (1990).

Chung, V., et al., "An Efficient Implementation of Parallel A", *CFPAR*, Montreal, Canada, pp. 153-167 (1994).

Fredman, M., et al., "Fibonacci heaps and their uses in improved network optimization algorithms", *Journal of the ACM*, 34 (3), 2 pages (1987).

Fu, L., "Heuristic Shortest Path Algorithms and their Potential IVHS Applications", *Proceedings of the Fourth University of Alberta—University of Calgary, Joint Graduate Student Symposium in Transportation Engineering*, pp. 83-109 (1995).

Ikeda, T., et al., "A Fast Algorithm for Finding Better Routes by AI Search Techniques", *Vehicle Navigation and Information Systems Conference Proceedings*, pp. 291-296, (1994).

Kaindl, H., et al., "Memory-Bounded Bidirectional Search", *Proceedings of the 12th National Conference on Art*, AAAI Press, Seattle, WA, pp. 1359-1364, (1994).

Laporte, G., "The Vehicle Routing Problem: An overview of exact and approximate algorithms", *European Journal of Operational Research*, 59, pp. 345-358 (1992).

Myers, B., "Data Structures for Best-First Search", http:www4.ncsu.edu/jbmyers/dsai.htm, pp. 1-6, (1997).

Ronngren, R., et al., "Parallel and Sequential Priority Queue Algorithms", *ACM Transactions on Modeling and Computer Simulation*, 7(2), pp. 168-172, 198, 1999 (1997).

Stout, B., "Smart Moves: Intelligent Pathfinding", *Gamasutra*, http://www.gamasutra.com/features/programming/080197/pathfinding.htm pp. 1-11, (1997).

Wal, L. et al., "Comparative Study of Shortest Path Algorithm for Transport Network", *USRP Report 2*, http://www.comp.nus.edu.sg/leonghoe/USRPreport-txt.html pp. 1-10 (1999).

Zhan, F.B., "Three Fastest Shortest Path Algorithms on Real Road Networks: Data Structures and Procedures", *Journal of Geographic Information and Decision Analysis*, 1(1), http://www.geog.uwo.ca/gimda/journal/vol1.1/Zhan/Zhan.htm, 11 pages, (1997).

Zhao, Y., et al., "An Adaptive Route-Guidance Algorithm for Intelligent Vehicle Highway Systems", *American Control Conference*, Boston, MA, Department of Electrical Engineering and Computer Science, The University of Michigan, pp. 2568-2573, (1991).

U.S. Appl. No. 10/032,250, filed Dec. 21, 2001, Childs et al.
U.S. Appl. No. 10/086,370, filed Feb. 18, 2002, Childs et al.
U.S. Appl. No. 10/269,573, filed Oct. 11, 2002, Childs et al.
U.S. Appl. No. 10/962,700, filed Oct. 12, 2004, Childs et al.
U.S. Appl. No. 10/976,998, filed Oct. 29, 2004, Childs et al.
U.S. Appl. No. 10/993,174, filed Nov. 19, 2004, Krull et al.
U.S. Appl. No. 10/993,189, filed Nov. 19, 2004, Childs et al.
U.S. Appl. No. 11/035,242, filed Jan. 13, 2005, Beesley et al.

Booten, A., "The Automatic Position Reporting System", http://www.oarc.net/aprs.htm, 5pages, (2002).

Bourrie, S. "Tendler Updates FoneFinder", Wireless Week, p. 24, Jun. 28, 1999.

Bravman, J.S. et al., "Automatic Vehicle Monitoring", 10 pages.

Chung et al.; Level-Compressed Huffman Decoding; IEEE-Transactions on Communication; Oct. 1999; vol. 47, No. 10; pp. 1455-1457.

Microsoft Press Computer Dictionary, Third Edition, Microsoft Press, p. 281 (1997).

Nekritch, Y.; Byte-oriented decoding of canonical Huffman codes; IEEE-Information Theory 2000; Jun. 2000; p. 371.

Nilsen, P., "Application of the Global-Positioning System (GPS) to Automatic Vehicle Monitoring", 1981 Carnahan Conference on Crime Countermeasures, University of Kentucky, pp. 7-11, (1981).

Oberhauser et al.; Fast data structures for shortest path routing: a comparative evaluation; 1995 IEEE International Conference on Gateway to Globalization; Jun. 1995; vol. 3, pp. 1597-1601.

Rosenberg, J. M. Dictionary of Computers, Information Processing and Telecommunications, Second Edition, Aug. 1990.

U.S. Appl. No. 11/035,243, filed Nov. 5, 2003, Krull et al.

Auto Nav 2000 Plus, Inc—Magellan 750M Plus, Sep. 1, 2000, 7 pages, http://www.autonav2000.com/Products/750M-Plus.htm.

http://hertzneverlost.com/basic.php, printed Jun. 30, 2005.
http://hertzneverlost.com/index.php, printed Jun. 30, 2005.
http://hertzneverlost.com/reference.php, printed Jun. 30, 2005.
http://www.autonav2000.com/Products/750NavPlus.htm, printed Jun. 30, 2005.
http://www.autonav2000.com/Products/750Plus.htm, printed Jun. 30, 2005.

Nardelli et al., "Time and Space Efficient Secondary Memory Representation of Quadtrees." Information Systems, vol. 22, No. 1, Elsevier Science Ltd. 1997, pp. 25-37.

Tousidou et al., "A performance Comparison of Quadtree-based Access Methods for Thematic Maps." Proceedings of the 2000 ACM symposium on Applied Computing, vol. 1, ACM Press, 2000, pp. 381-388.

Zhao, Y., "Vehicle Location and Navigation Systems", Artech House, Norwood, Massachusetts, (1997).

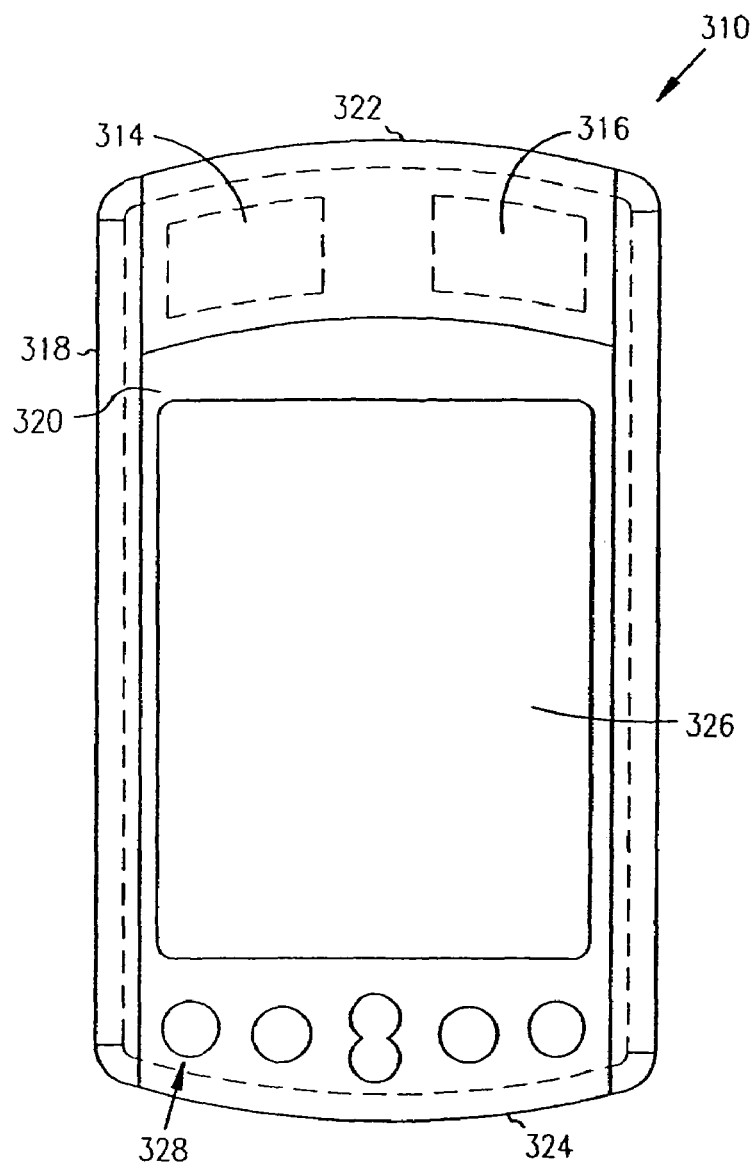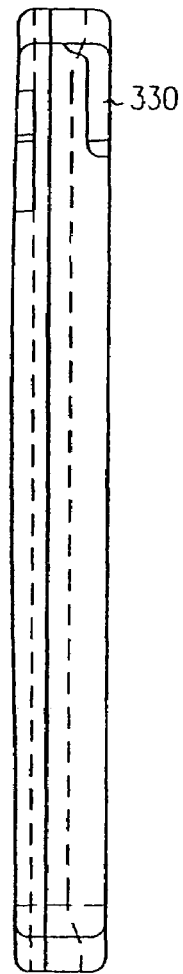
FIG. 3A  FIG. 3B
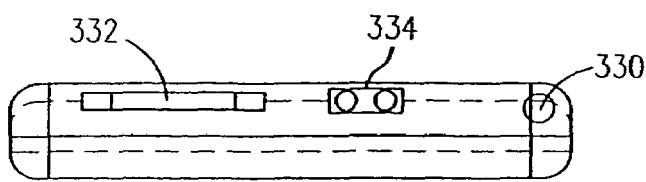
FIG. 3C

US 7,269,508 B1

GUIDANCE WITH FEATURE ACCOUNTING FOR INSIGNIFICANT ROADS

CROSS REFERENCE TO RELATED APPLICATIONS

This application is a continuation of U.S. application Ser. No. 10/032,196, filed Dec. 21, 2001 now U.S. Pat. No. 6,847,890, the specification of which is incorporated herein by reference.

FIELD OF THE INVENTION

The present invention relates generally to navigational devices, and in particular to navigational route guidance that accounts for insignificant route segments or roads.

BACKGROUND OF THE INVENTION

Route planning devices are well known in the field of navigational instruments. The capabilities of known route planning devices and methods depend on system resources, such as processor speed and the amount and speed of memory. The processes implemented by a navigation device are a function of overall system cost because an increase in system capability also increases system cost. The known art includes a spectrum of products in which the degree of navigational accuracy is dictated primarily by the cost of the system. The lower cost systems currently offer a lower degree of accuracy that often is inadequate for most users.

Processes inherently affected by the limited system resources include navigational route planning and navigational route guidance. A navigational route between a starting destination and a final destination is determined using cartographic data. The navigational route is formed from a number of a navigational route segments. These route segments, for example, include the various roads that are traveled upon to move from the starting destination to the final destination.

Navigational route guidance provides information to a user to guide the user along the route from route segment to route segment. That is, navigational route guidance provides information used to maneuver from one route segment to another route segment. Such guidance is desirable when a user is confronted with maneuvering options, such as whether to turn left or right, for example, onto the next route segment or road.

However, some route segments are essentially insignificant in so far as traveling from a first significant route segment through an insignificant route segment to a second significant route segment essentially only confronts the user with an obvious maneuvering option between the first significant route segment and the second significant route segment. An example of an insignificant route segment is a separately digitized turn lane.

Attempts to provide guidance information from the first significant route segment to the insignificant route segment, and to provide guidance information from the insignificant route segment to the second significant route segment is unnecessary information as it is extraneous or redundant. Users view maneuvers associated with insignificant route segments interposed between two significant route segments as obvious maneuvers. Thus, users only desire appropriate navigational guidance from the first significant route segment to the second significant route segment.

Therefore, there exists a need for route guidance that appropriately accounts for insignificant route segments by nullifying, and/or modifying route guidance maneuvers associated with the insignificant route segments to improve a route guidance experience.

SUMMARY OF THE INVENTION

The above mentioned problems of navigational devices are addressed by the present invention and will be understood by reading and studying the following specification. Systems, devices and methods are provided to identify insignificant route segments and to provide clear and concise route guidance by appropriately accounting for the insignificant route segments. As such, a route guidance experience is enhanced.

One aspect of the present invention provides an electronic navigational device. According to one embodiment, the device includes a processor and a memory adapted to communicate with the processor. The processor and memory are adapted to cooperate to perform processes, and in particular, to perform a route guidance process that accounts for insignificant route segments.

According to one embodiment, the insignificant segment is accounted for by skipping or nullifying route guidance for a maneuver associated with the insignificant segment, i.e. for a maneuver that immediately proceeds or follows the insignificant segment. According to another embodiment, the insignificant route segment is accounted for by modifying a route guidance maneuver associated with the insignificant route segment.

According to one embodiment, a sequence of route segments and a sequence of maneuvers associated with the route segments are identified. It is determined whether a segment in the sequence of route segments is significant or insignificant. The processor and memory provide route guidance for a maneuver associated with significant segments, and account for an insignificant segment prior to providing route guidance for a maneuver associated with the insignificant segment.

Other aspects provided herein include a navigation system and a method. These, as well as other novel aspects, embodiments, advantages, details, and features of the present invention will be apparent to those skilled in the art from the following detailed description of the invention, the attached claims and accompanying drawings, listed herein below, which are useful in explaining the invention.

BRIEF DESCRIPTION OF THE DRAWINGS

FIGS. 3A-3C illustrate views for another embodiment of an electronic navigational device;

DETAILED DESCRIPTION OF THE INVENTION

A better understanding of the present invention reference may be had to the following detailed description taken in conjunction with dependant claims and accompanied drawings. In essence, the present invention allows an electronic navigation device to account for insignificant route segments to enhance a route guidance experience by nullifying and/or modifying route guidance maneuvers associated with insignificant route segments.

Figure 1:
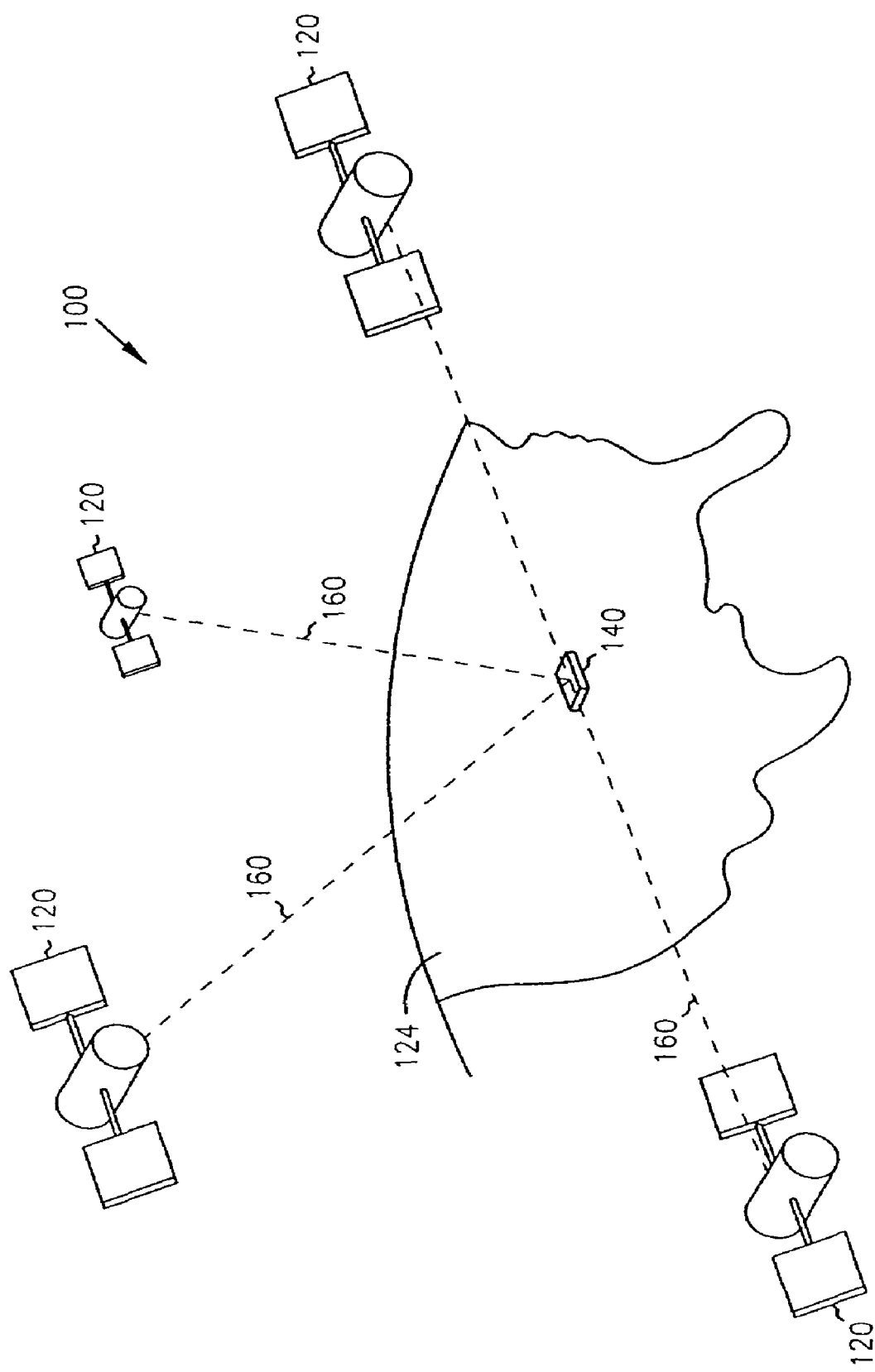
FIG. 1 is a representative of a global positioning system (GPS)

FIG. 1 is a representative of a global positioning system (GPS). The GPS 100 includes a plurality of satellites 120 and a GPS receiver device 140. The plurality of satellites 120 are in orbit about the Earth 124. The orbit of each satellite 120 is not necessarily synchronous with the orbits of other satellites 120 and, in fact, is likely asynchronous. The GPS receiver device 140 of the present invention is shown receiving spread spectrum GPS satellite signals 160 from the various satellites 120.

The spread spectrum signals 160 continuously transmitted from each satellite 120 utilize a highly accurate frequency standard accomplished with an extremely accurate atomic clock. Each satellite 120, as part of its data signal transmission 160, transmits a data stream indicative of that particular satellite 120. It will be appreciated by those skilled in the relevant art that the GPS receiver device 140 must acquire spread spectrum GPS satellite signals 160 from at least three satellites 120 for the GPS receiver device 140 to calculate its two-dimensional position by triangulation. Acquisition of an additional signal 160, resulting in signals 160 from a total of four satellites 120, permits GPS receiver device 140 to calculate its three-dimensional position.

Figure 2A:
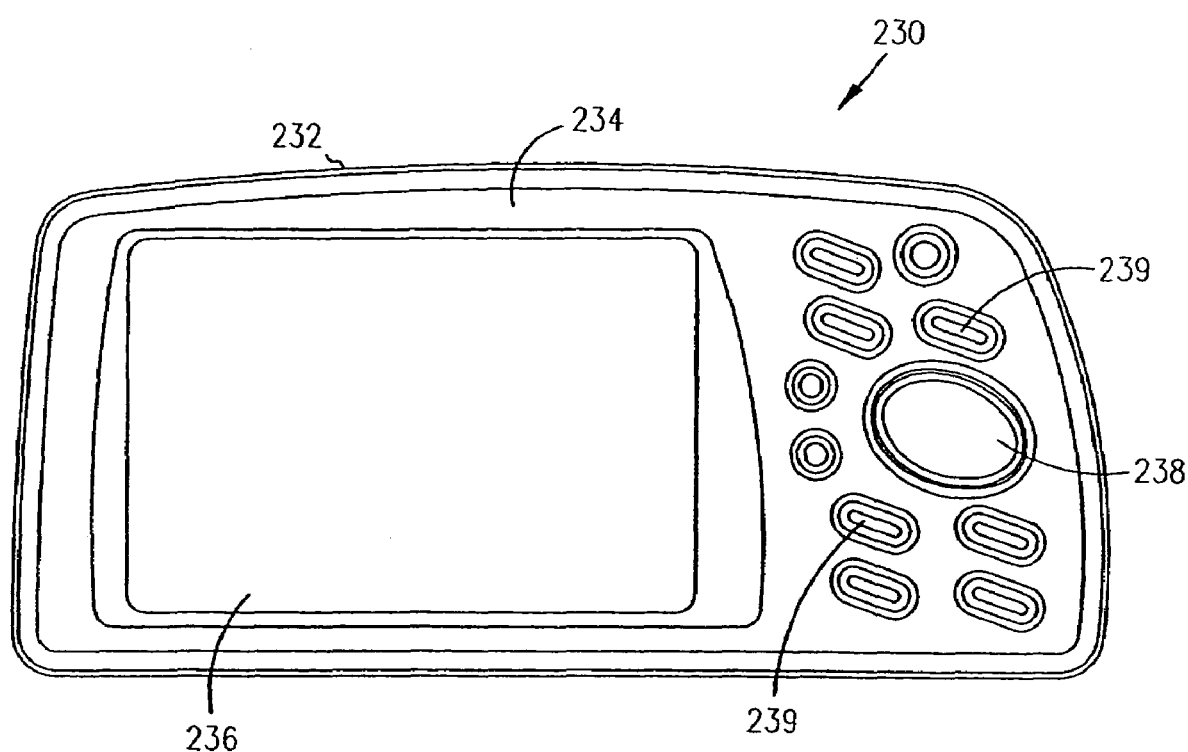
FIGS. 2A and 2B illustrate views for one embodiment of an electronic navigational device.
Figure 2B:
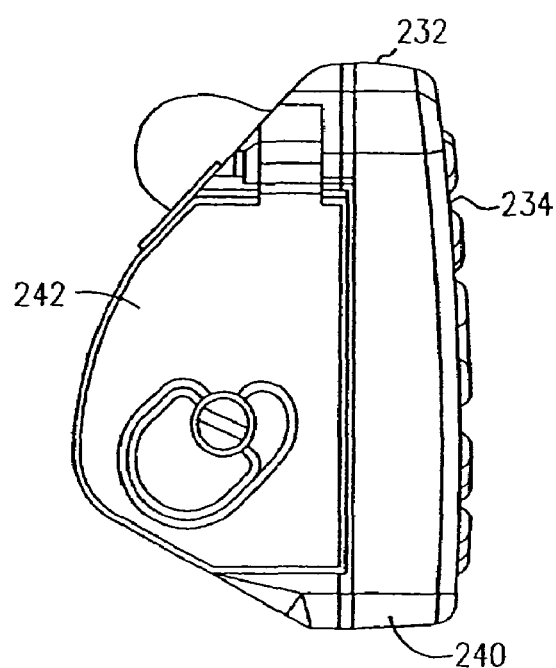

FIGS. 2A and 2B illustrate views for one embodiment of an electronic navigational device 230 according to the teachings of the present invention. As one of ordinary skill in the art will understand upon reading this disclosure, the device can be portable and can be utilized in any number of implementations such as automobile, personal marine craft, and avionic navigation. In the embodiment of FIG. 2A a front view of the navigational device 230 is provided showing the navigational device has a generally rectangular housing 232. The housing 232 is constructed of resilient material and has been rounded for aesthetic and ergonomic purposes. As shown in FIG. 2A, the control face 234 has access slots for an input key pad 238, other individual keys 239, and a display screen 236. In one embodiment, the display screen 236 is a LCD display which is capable of displaying both text and graphical information. The invention, however, is not so limited.

In FIG. 2B, a side view of the navigational device 230 is provided. FIG. 2B illustrates that the device's housing 232 is defined by an outer front case 240 and a rear case 242. As shown in FIG. 2B, the outer front case 240 is defined by the control face 234. In the embodiment shown in FIG. 2B, the outer front case 240 and the rear case 242 are made of separate molded pieces to form the device housing 232 and support input key pad 238, other individual keys 239, and display screen 236 in respective access slots shown in the control face 234 of FIG. 2A.

FIGS. 3A-3C illustrate views for another embodiment of an electronic navigational device 310 according to the teachings of the present invention. The navigational device 310 shown in FIGS. 3A-3C includes a personal digital assistant (PDA) with integrated GPS receiver and cellular transceiver according to the teachings of the present invention. The GPS integrated PDA operates with an operating system (OS) such as, for example, the well-known Palm or Pocket PC operating systems, or the lesser-used Linux OS. As shown in the top view of FIG. 3A, the GPS integrated PDA 310 includes an internal integrated GPS patch antenna 314 and a cellular transceiver 316 contained in a housing 318. The housing 318 is generally rectangular with a low profile and has a front face 320 extending from a top end 322 to a bottom end 324. Mounted on front face 320 is a display screen 326, which is touch sensitive and responsive to a stylus 330 (shown stored in the side view of FIG. 3B) or a finger touch. FIGS. 3A-3C illustrate the stylus 330 nested within housing 318 for storage and convenient access in a conventional manner. The embodiment shown in FIG. 3A illustrates a number of control buttons, or input keys 328 positioned toward the bottom end 324. The invention, however, is not so limited and one of ordinary skill in the art will appreciate that the input keys 328 can be positioned toward the top end 322 or at any other suitable location. The end view of FIG. 3C illustrates a map data cartridge bay slot 332 and headphone jack 334 provided at the top end 322 of the housing 318. Again, the invention is not so limited and one of ordinary skill in the art will appreciate that a map data cartridge bay slot 332 and headphone jack 334 can be provided at the bottom end 324, separately at opposite ends, or at any other suitable location.

It should be understood that the structure of GPS integrated PDA 310 is shown as illustrative of one type of integrated PDA navigation device. Other physical structures, such as a cellular telephone and a vehicle-mounted unit are contemplated within the scope of this invention.

FIGS. 2A-2B and 3A-3C are provided as illustrative examples of hardware components for a navigational device according to the teachings of the present invention. However, the invention is not limited to the configuration shown in FIGS. 2A-2B and 3A-3C. One of ordinary skill in the art will appreciate other suitable designs for a hardware device which can accommodate the present invention.

Figure 4A:
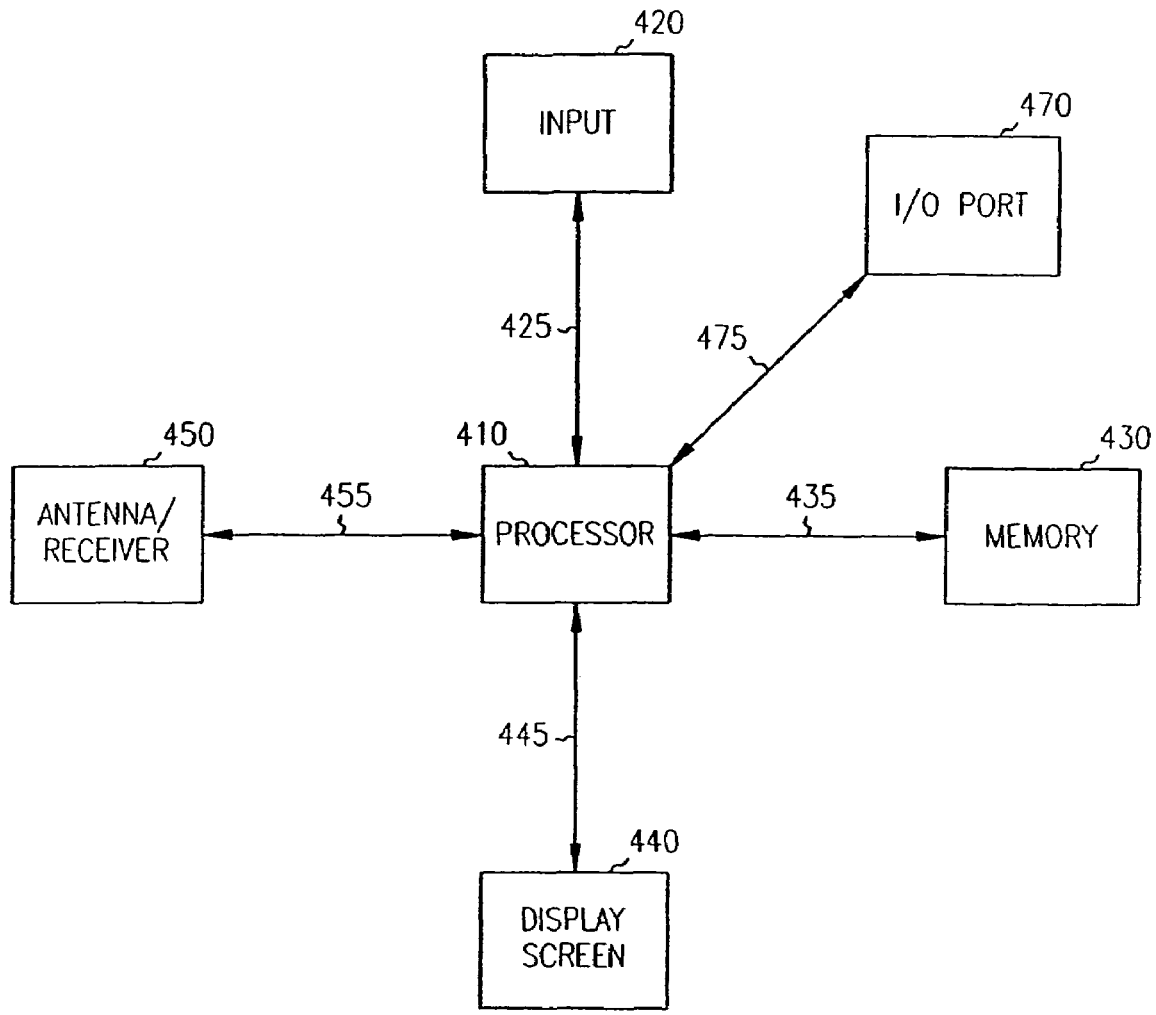
FIG. 4A is a block diagram of one embodiment for the electronic components within the hardware of FIGS. 2A-2B.

FIG. 4A is a block diagram of one embodiment for the electronic components within the hardware of FIGS. 2A-2B, such as within housing 332 and utilized by the electronic navigational device. In the embodiment shown in FIG. 4A, the electronic components include a processor 410 which is connected to an input 420, such as keypad via line 425. It will be understood that input 420 may alternatively be a microphone for receiving voice commands. Processor 410 communicates with memory 430 via line 435. Processor 410 also communicates with display screen 440 via line 445. An antenna/receiver 450, such as a GPS antenna/receiver is connected to processor 410 via line 455. It will be understood that the antenna and receiver, designated by reference numeral 450, are combined schematically for illustration, but that the antenna and receiver may be separately located components, and that the antenna may be a GPS patch antenna or a helical antenna. The electronic components further include I/O ports 470 connected to processor 410 via line 475. According to one embodiment, a speaker 480 is connected to the processor 410 via line 485, and the device is adapted to provide the voice guidance through the speaker 480. According to one embodiment, the device is adapted to be connected to an auxiliary speaker, such as a speaker from a car stereo, earphones or an earpiece, and is adapted to provide the voice guidance through the auxiliary speaker.

Figure 4B:
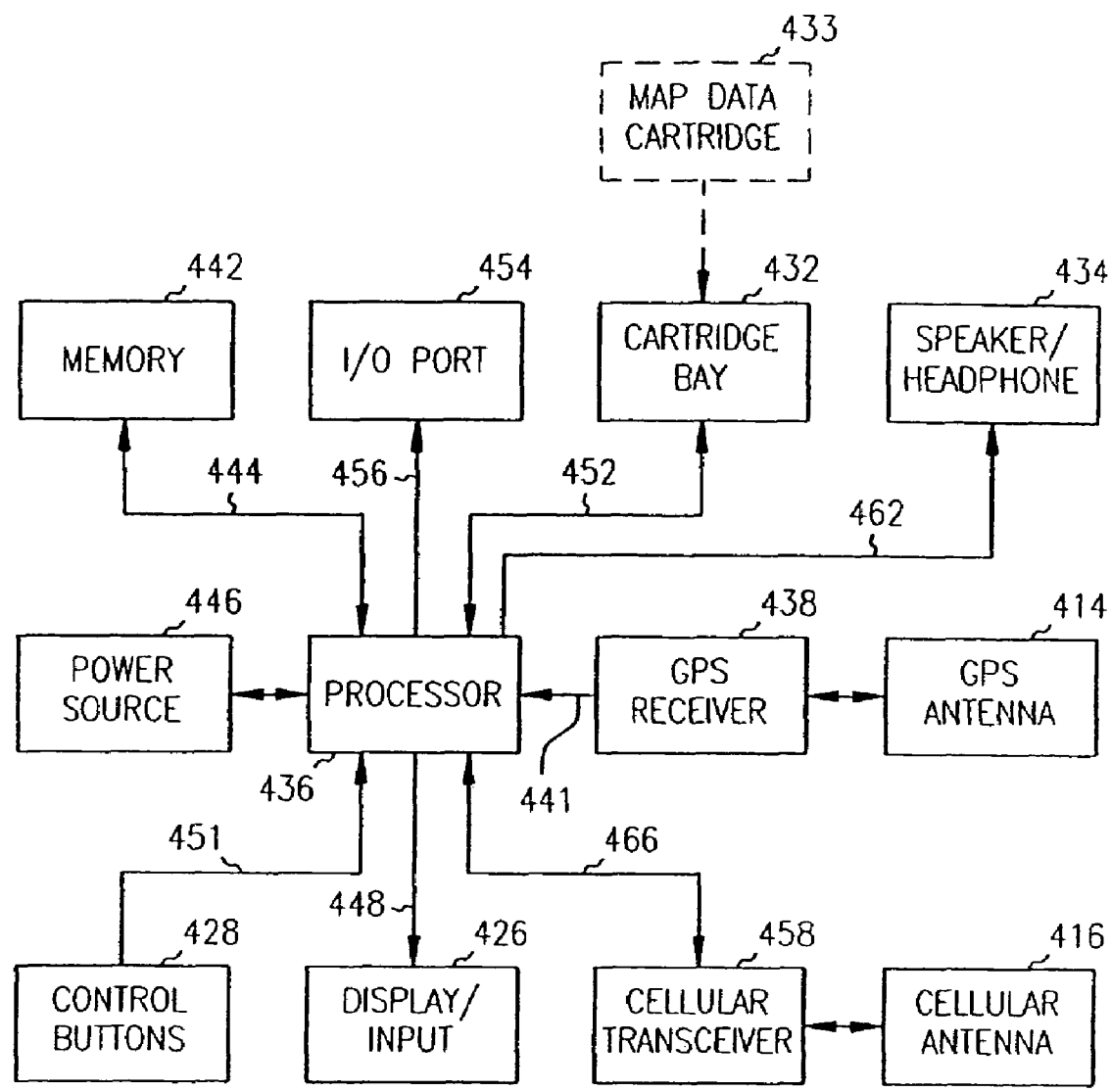
FIG. 4B is a block diagram of one embodiment for the electronic components within the hardware of FIGS. 3A-3C.

FIG. 4B is a block diagram of one embodiment for the electronic components within the hardware of FIGS. 3A-3C and utilized by the GPS integrated PDA 310 according to the teachings of the present invention. The electronic components shown in FIG. 4B include a processor 436 which is connected to the GPS antenna 414 through GPS receiver 438 via line 441. The processor 436 interacts with an operating system (such as PalmOS; Pocket PC) that runs selected software depending on the intended use of the PDA 310. Processor 436 is coupled with memory 442 such as RAM via line 444, and power source 446 for powering the electronic components of PDA 310. The processor 436 communicates with touch sensitive display screen 426 via data line 448.

The electronic components further include two other input sources that are connected to the processor 436. Control buttons 428 are connected to processor 436 via line 451 and a map data cartridge 433 inserted into cartridge bay 432 is connected via line 452. A conventional serial I/O port 454 is connected to the processor 436 via line 456. Cellular antenna 416 is connected to cellular transceiver 458, which is connected to the processor 436 via line 466. Processor 436 is connected to the speaker/headphone jack 434 via line 462. The PDA 310 may also include an infrared port (not shown) coupled to the processor 436 that may be used to beam information from one PDA to another.

As will be understood by one of ordinary skill in the art, the electronic components shown in FIGS. 4A and 4B are powered by a power source in a conventional manner. As will be understood by one of ordinary skill in the art, different configurations of the components shown in FIGS. 4A and 4B are considered within the scope of the present invention. For example, in one embodiment, the components shown in FIGS. 4A and 4B are in communication with one another via wireless connections and the like. Thus, the scope of the navigation device of the present invention includes a portable electronic navigational aid device.

According to the teachings of the present invention, the electronic components embodied in FIGS. 4A and 4B are adapted to perform a route guidance process that accounts for insignificant route segments. That is, according to the teachings of the present invention, a processor 410 is provided with the electronic navigational aid device, and a memory 430 is connected to the processor 410. The memory 430 includes cartographic data, and algorithms for performing the route planning and route guidance processes. According to one embodiment, a display 440 is adapted to communicate with the processor 410 and is capable of providing a visual indication of the planned route and the route guidance to a user. According to one embodiment, a speaker 480 is adapted to communicate with the processor 410 and is capable of providing an audio indication of the route guidance to a user.

As will be discussed in more detail below, the processor 410 and memory 430 cooperate to perform various processes according to the teachings of the present invention. According to one embodiment, the processor 410 and memory 430 cooperate to provide route guidance that accounts for insignificant route segments. According to various embodiment, the route guidance provided by the processor 410 and memory 430 accounts for insignificant segments by nullifying and/or modifying maneuvers associated with the insignificant route segments. These, and other embodiments, are discussed in more detail below.

Figure 5:
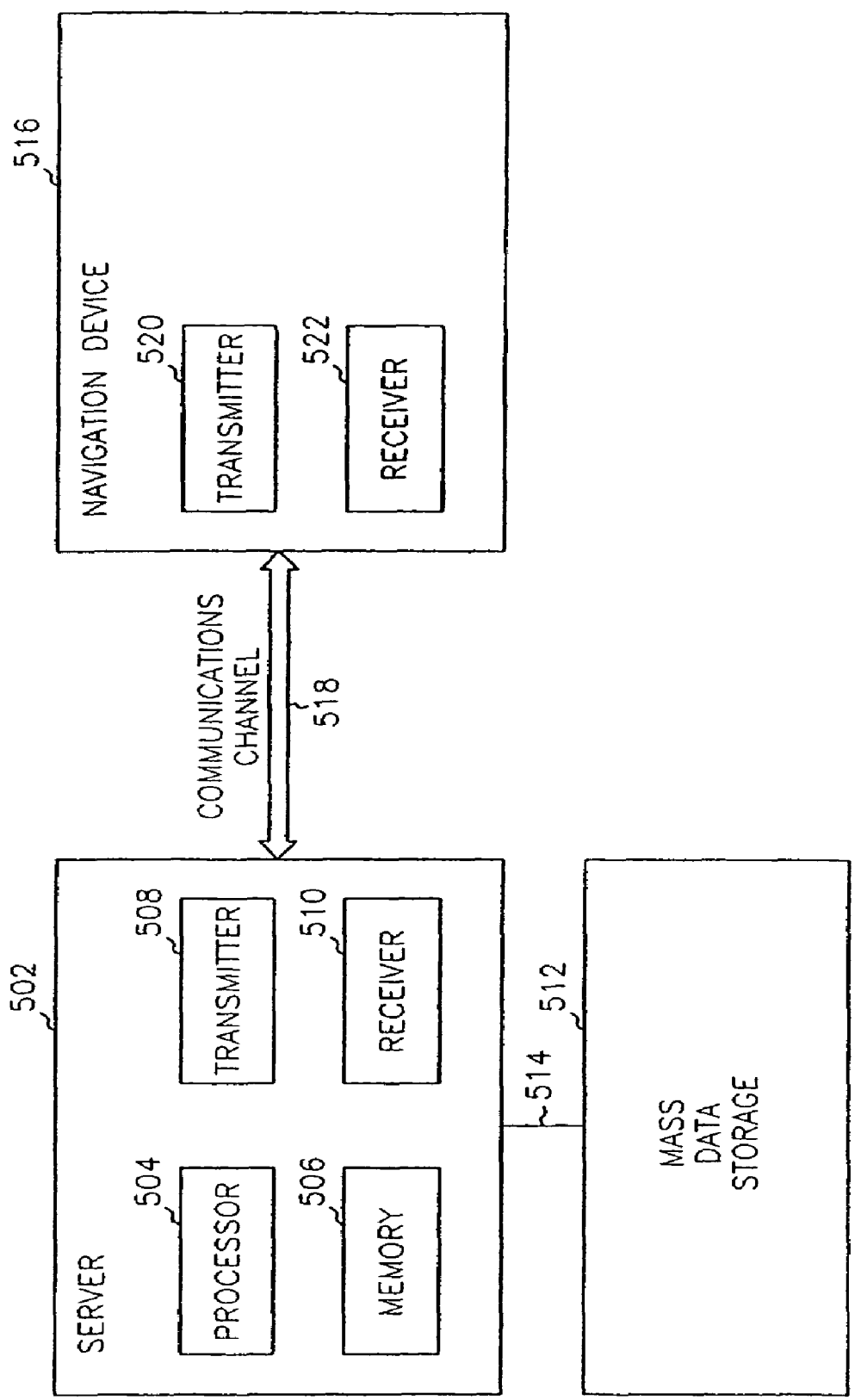
FIG. 5 is a block diagram of a navigation system.

FIG. 5 is a block diagram of an embodiment of a navigation system. The navigation system 500 includes a server 502. According to one embodiment, the server 502 includes a processor 504 operably coupled to memory 506, and further includes a transmitter 508 and a receiver 510 to send and receive communication signals. The transmitter 508 and receiver 510 are selected or designed according to the communication requirements and the communication technology used in the communication design for the navigation system. The functions of the transmitter 508 and the receiver 510 may be combined into a single transceiver.

The navigation system further includes a mass data storage 512 coupled to the server 502 via communication link 514. The mass data storage 512 contains a store of navigation data. One of ordinary skill in the art will understand, upon reading and comprehending this disclosure, that the mass data storage 512 can be a separate device from the server 502 or can be incorporated into the server 502.

According to one embodiment, the navigation system further includes a navigation device 516 adapted to communicate with the server 502 through the communication channel 518. According to one embodiment, the navigation device 516 includes a processor and memory, as previously shown and described with respect to the block diagrams of FIGS. 4A and 4B. Furthermore, the navigation device 516 includes a transmitter 520 and receiver 522 to send and receive communication signals through the communication channel 518. The transmitter 520 and receiver 522 are selected or designed according to the communication requirements and the communication technology used in the communication design for the navigation system. The functions of the transmitter 520 and receiver 522 may be combined into a single transceiver.

Software stored in the server memory 506 provides instructions for the processor 504 and allows the server 502 to provide services to the navigation device 516. One service provided by the server 502 involves processing requests from the navigation device 516 and transmitting navigation data from the mass data storage 512 to the navigation device 516. According to one embodiment, another service provided by the server 502 includes processing the navigation data using various algorithms for a desired application, and sending the results of these calculations to the navigation device 516.

The communication channel 518 is the propagating medium or path that connects the navigation device 516 and the server 502. According to one embodiment, both the server 502 and the navigation device 516 include a transmitter for transmitting data through the communication channel and a receiver for receiving data that has been transmitted through the communication channel.

The communication channel 518 is not limited to a particular communication technology. Additionally, the communication channel 518 is not limited to a single communication technology; that is, the channel 518 may include several communication links that use a variety of technology. For example, according to various embodiments, the communication channel is adapted to provide a path for electrical, optical, and/or electromagnetic communications. As such, the communication channel includes, but is not limited to, one or a combination of the following: electrical circuits, electrical conductors such as wires and coaxial cables, fiber optic cables, converters, radio-frequency (RF) waveguides, the atmosphere, and empty space. Furthermore, according to various embodiments, the communication channel includes intermediate devices such as routers, repeaters, buffers, transmitters, and receivers, for example.

In one embodiment, for example, the communication channel 518 includes telephone and computer networks. Furthermore, in various embodiments, the communication channel 516 is capable of accommodating wireless communication such as radio frequency, microwave frequency and infrared communication, and the like. Additionally, according to various embodiments, the communication channel 516 accommodates satellite communication.

The communication signals transmitted through the communication channel 518 include such signals as may be required or desired for a given communication technology. For example, the signals may be adapted to be used in cellular communication technology, such as time division multiple access (TDMA), frequency division multiple access (FDMA), code division multiple access (CDMA), global system for mobile communications (GSM), and the like. Both digital and analog signals may be transmitted through the communication channel 518. According to various embodiments, these signals are modulated, encrypted and/or compressed signals as may be desirable for the communication technology.

The mass data storage includes sufficient memory for the desired navigation application. Examples of mass data storage include magnetic data storage media such as hard drives, optical data storage media such as CD ROMs, charge storing data storage media such as Flash memory, and molecular memory.

According to one embodiment of the navigation system, the 502 server includes a remote server accessed by the navigation device 516 through a wireless channel. According to other embodiments of the navigation system, the server 502 includes a network server located on a local area network (LAN), wide area network (WAN), a virtual private network (VPN) and server farms.

According to another embodiment of the navigation system, the server 502 includes a personal computer such as a desktop or laptop computer. In one embodiment, the communication channel 518 is a cable connected between the personal computer and the navigation device. According to one embodiment, the communication channel 518 is a wireless connection between the personal computer and the navigation device 516.

As will be discussed in more detail below, the system performs various processes according to the teachings of the present invention. According to one embodiment, the mass data storage 512 is adapted to store navigation data. According to various embodiments, the navigation data includes text, images and/or audio. The server 502 communicates with the mass data storage 512, and thus is able to access and/or process the navigation data. The navigation device 516 communicates with and retrieves navigation data from the server 502 via a communication channel 518.

The navigation device includes a processor and a memory connected to the processor, as previously described with respect to the device of FIGS. 4A and 4B. According to one embodiment, the processor and memory of the navigation device are adapted to provide a route planning process and/or provide route guidance that accounts for the insignificant route segments. According to another embodiment, the processor 504 and memory 506 of the server 502 are adapted to provide a route planning process and/or provide route guidance that accounts for the insignificant route segments. According to various embodiments, the route guidance provided by the system accounts for insignificant segments by nullifying and/or modifying maneuvers associated with the insignificant route segments. These, and other embodiments, are discussed in more detail below.

Figure 6:
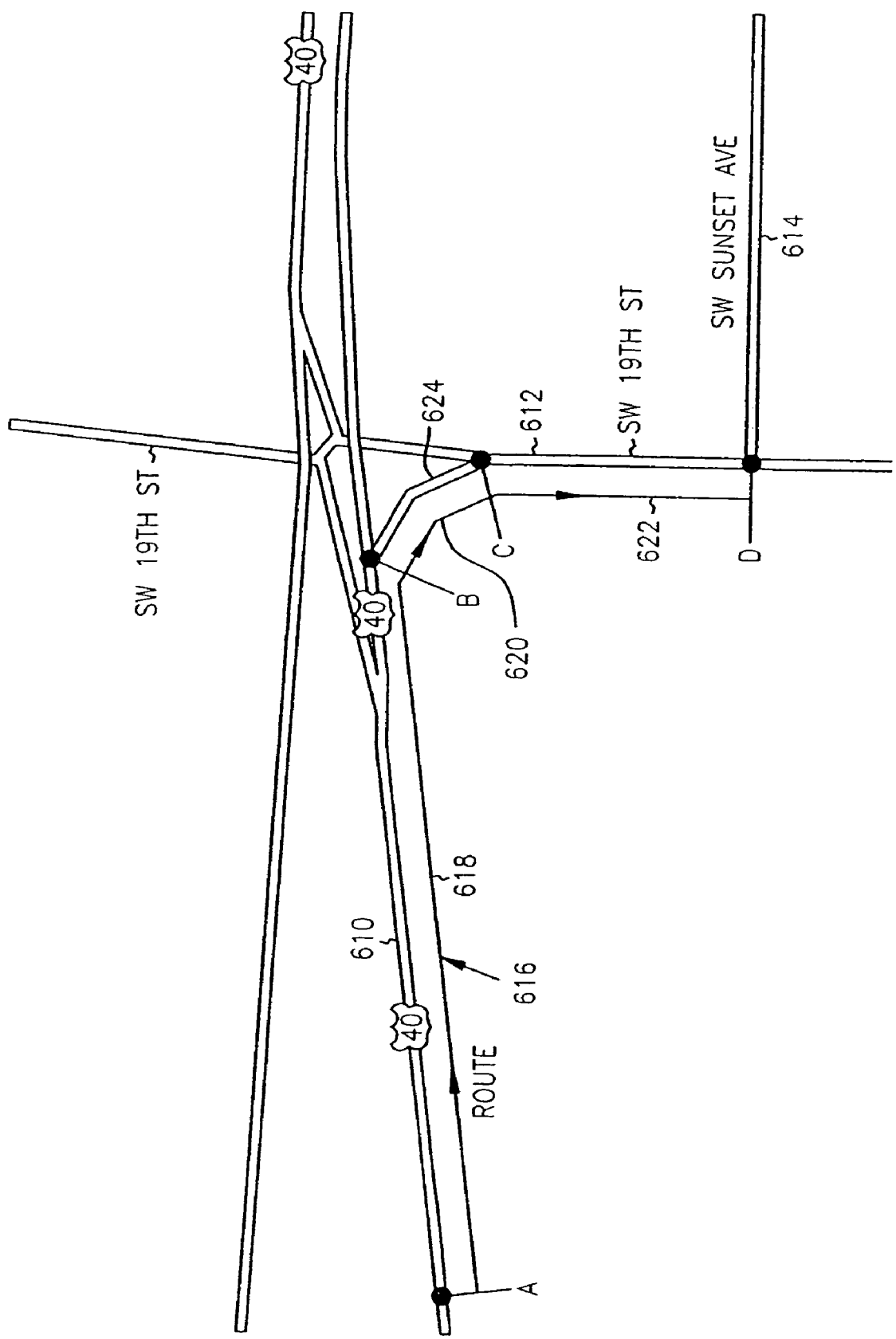
FIG. 6 is an example of a navigation route that includes an insignificant route segment.

FIG. 6 is an example of a navigation route that includes an insignificant route segment. In this example, a map is shown that includes an intersection between a split highway 610 (US-40) and a street 612 (SW 19th St), and further includes an intersection between the street 612 (SW 19th St.) and an avenue 614 (SW Sunset Ave). A planned route, designated with the reference numeral 616, extends from point "A" on US-40 610 to point D at the intersection of SW 19th St 612 and SW Sunset Ave 614.

The route 616 includes a first significant route segment 618 extending between points A and B, an insignificant route segment 620 extending between points B and C, and a second significant route segment 622 extending between points C and D. The route segment 620 corresponds to the turn lane 624, and is characterized as insignificant for navigation route guidance because the maneuvering decision to exit in the desired direction on 19th St 612 is made at point B. Once on the turn lane 624, as represented by the insignificant segment 620, the decision to merge or turn right on 19th St 612 is an obvious decision as the user essentially does not have another option at point C.

A route guidance process that does not account for insignificant route segments would likely generate two Turn Right maneuvers. One Turn Right maneuver would be at point B. The other Turn Right maneuver would be at point C. One of ordinary skill in the art will understand upon reading and comprehending this disclosure that other route segments preceded by one maneuver and followed by another maneuver may be considered insignificant.

The insignificant segment 620 is essentially a turn lane that does not confront a user with maneuvering options. Therefore, the user only desires guidance to turn right at point B. Thus, FIG. 6 provides an example of a planned route 616 that includes route segments 618, 620 and 622, and further provides an example of an insignificant route segment 620.

More generally, a planned route is formed from a plurality of route segments. A route guidance maneuver is associated with each segment to assist the user with transitions between route segments. Several examples of route guidance maneuvers are presented below. The route guidance maneuver examples provided below are not intended to be an exhaustive list of such maneuvers.

One maneuver is Continue which indicates that there is no turn decision to be made. According to one embodiment, a user is not explicitly instructed to continue on a route. Rather, because most of the route is a Continue, it is assumed that the user will not make any turn maneuvers unless otherwise instructed. Since an explicit route guidance command is not provided according to some embodiments, the Continue maneuver may be considered to be a null maneuver or a skipped maneuver.

Other maneuvers include Turn Left, Turn Right, Turn Sharp Left, Turn Sharp Right, and U-Turn. These turn maneuvers occur at intersections, and are believed to be self-explanatory.

Other maneuvers include Keep Left and Keep Right. These maneuvers often occur when a road splits into a "V" such as on a major highway or a ramp. Another maneuver is Take Ramp which indicates an off ramp off of a highway or an on ramp onto a highway. Another maneuver is Merge, which provides an indication to merge with traffic on a road, as may be appropriate traveling from a ramp onto a road.

According to various embodiments, several factors are considered in making the determination of whether a route segment is significant or insignificant. One factor is segment length. According to one embodiment, the segment length must be under a predetermined length in order to warrant consideration as a insignificant route segment. In one embodiment, the segment length must be under 100 meters in order to be considered potentially insignificant. According to one embodiment, in order for a segment to be considered potentially insignificant, the length of the segment must be shorter than the length of a successive route segment; i.e. the route segment that immediately follows the current route segment.

Another factor considered in making the determination of whether a route segment is significant or insignificant is whether the segment is named. An unnamed route segment is considered to be a potentially insignificant route segment.

Another factor involves whether the maneuver type at the start of a route segment and the maneuver type at the end of the segment qualify such that the route segment may be considered an insignificant route segment. That is, the maneuvers performed at the start and at the end of a route segment have certain characteristics or relationships that are consistent with insignificant route segments.

As will be understood by one of ordinary skill in the art upon reading and comprehending this disclosure, the process of characterizing a route segment as insignificant may include one of the factors described above, or any combination thereof. Additionally, one of ordinary skill in the art will understand that the factors do not have to be considered in any particular order.

There are a number of special cases that have special case handlers to modify guidance for maneuvers. These cases include, but are not limited to, Ramp/Merge, Roundabouts, and Ramp/Ramp transitions. Special case handlers are provided for these special cases.

For example, in the drawing of FIG. 6, a turn lane classified as a digitized turn lane is shown. A first Turn Right maneuver occurs at point B and a second Turn Right maneuver occurs at point C such that the segment BC is a turn lane. However, in order to provide clear and concise guidance, it is desired to provide only a single Turn Right maneuver for the digitized turn lane. The second Turn Right maneuver is effectively nullified or skipped. As a result, the user is guided through a single Turn Right maneuver at point B.

However, should the segment BC, or a segment similar thereto, be classified as a ramp, for example, a Take Ramp maneuver occurs at point B and a Merge maneuver occurs at point C. The merge maneuver may be nullified by changing the maneuver to a Continue maneuver, which would only leave a Take Ramp maneuver. However, in order to provide clear and concise route guidance, it is desirable to modify one of the maneuvers. For example, the combined turn angle from segment AB to segment CD is used to derive a simple turn maneuver, such as Turn Right. This derived turn maneuver is used in place of the Take Ramp/Merge maneuvers. Therefore, for example, the Take Ramp maneuver at point B is modified to a Turn Right maneuver, and the Merge maneuver at point C is replaced with a Continue maneuver which effectively nullifies or skips the guidance maneuver between route segments BC and CD. As a result, the user is guided through one maneuver (Turn Right) rather than through two maneuvers (Take Ramp and Merge).

If the route segment is characterized as an insignificant route segment, and if none of the special case handlers are applied, the maneuver at the start of the insignificant segment is replaced with the maneuver at the end of the segment. The maneuver at the end of the segment is modified to a Continue. This effectively nullifies or skips one of the maneuvers associated with the insignificant route segment since a user is not explicitly instructed to continue on a route.

Figure 7:
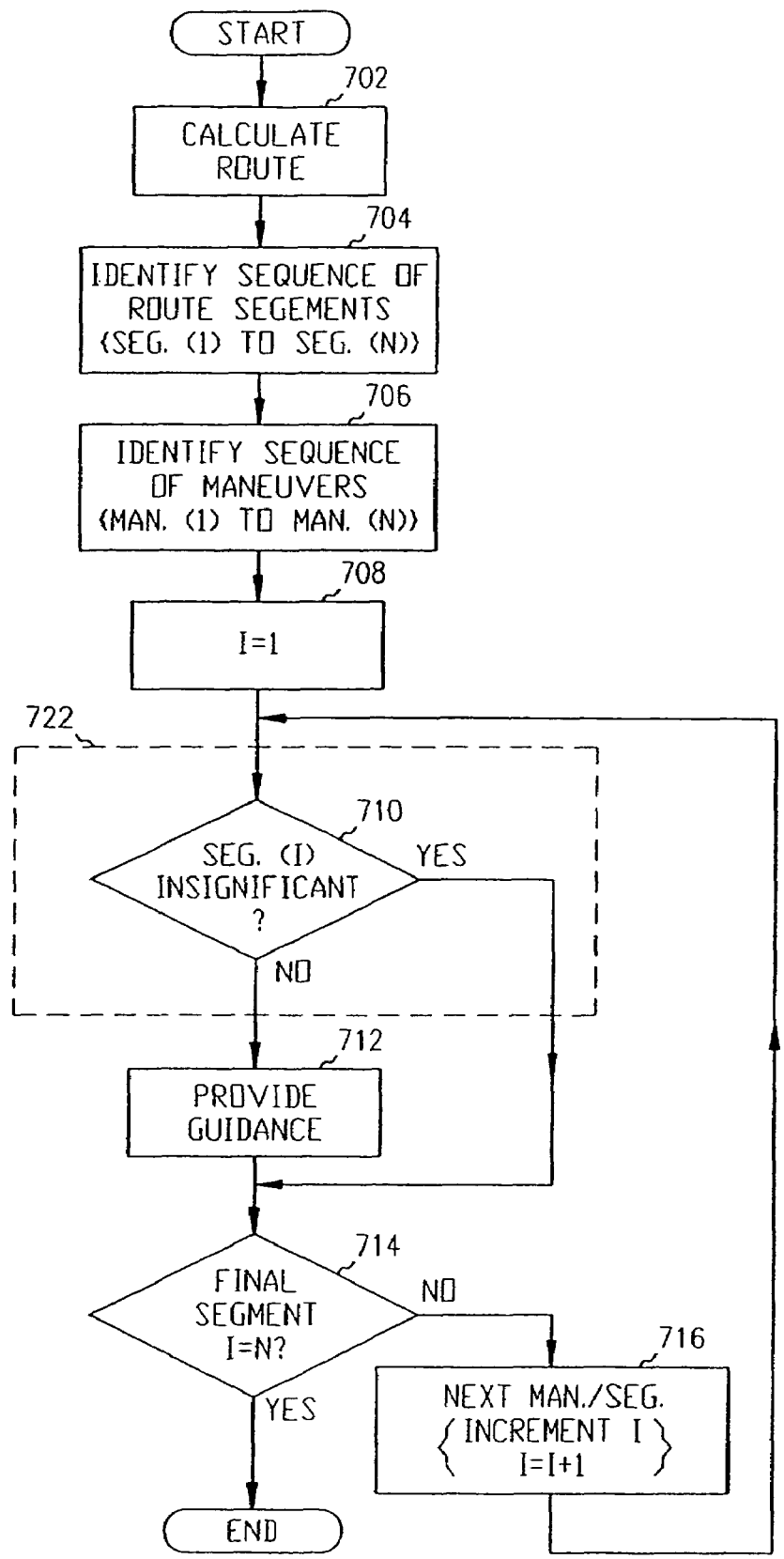
FIG. 7 is a flow diagram illustrating one embodiment of a route guidance process according to the present invention.

FIG. 7 is a flow diagram illustrating one embodiment of a route guidance process according to the present invention. According this process, a route is calculated, determined or otherwise provided at 702.

According to one embodiment, the route planning process is performed by the server 502 of FIG. 5. According to anther embodiment, the route planning process is performed by the navigation device 516 of FIG. 5. This route is formed from a series of N segments, such that the sequence of route segments extends from segment SEG(1) to segment SEG(N). Each of these segments is associated with a route guidance maneuver, such that segment SEG(1) is associated with maneuver MAN(1) and segment SEG(N) is associated with maneuver MAN(N). MAN(1) is the maneuver performed to proceed on segment SEG(1), MAN(2) is the maneuver performed to proceed on segment SEG(2), and MAN(N) is the maneuver performed to proceed on segment SEG(N). The user arrives at the destination after completing travel along segment SEG(N).

At 704, the sequence of route segments, i.e. SEG(1) to SEG(N), is identified for the route. At 706, the sequence of maneuvers, MAN(1) to MAN(N), is identified for the sequence of route segments. A counter variable "I" is set to one at 708. As will be illustrated below, this counter variable counts from one to N to evaluate each route guidance maneuver and each route segment in sequence.

It is determined at 710 whether segment SEG(I) is insignificant. Upon determining that segment SEG(I) is not insignificant (i.e., upon determining that segment SEG(I) is significant), the process proceeds to 712 where route guidance is explicitly provided for the route guidance maneuver MAN(I). If, at 710, it is determined that segment SEG(I) is insignificant, the process skips or nullifies the route guidance represented at 712. As provided above, according to one embodiment, skipping or nullifying the route guidance maneuver involves changing the maneuver to a Continue maneuver. As provided above, according to one embodiment, a user is not explicitly instructed to continue on a route.

The process proceeds to 714, where it is determined whether the final segment has been reached. That is, it is determined if the counter variable I equals N. If the final segment has not been reached, the process proceeds to 716, where the counter variable I is incremented (I=I+1) so as to evaluate the next route guidance maneuver and the next route guidance segment, and the process returns to 710. If the final segment has been reached, the process ends.

Figure 8:
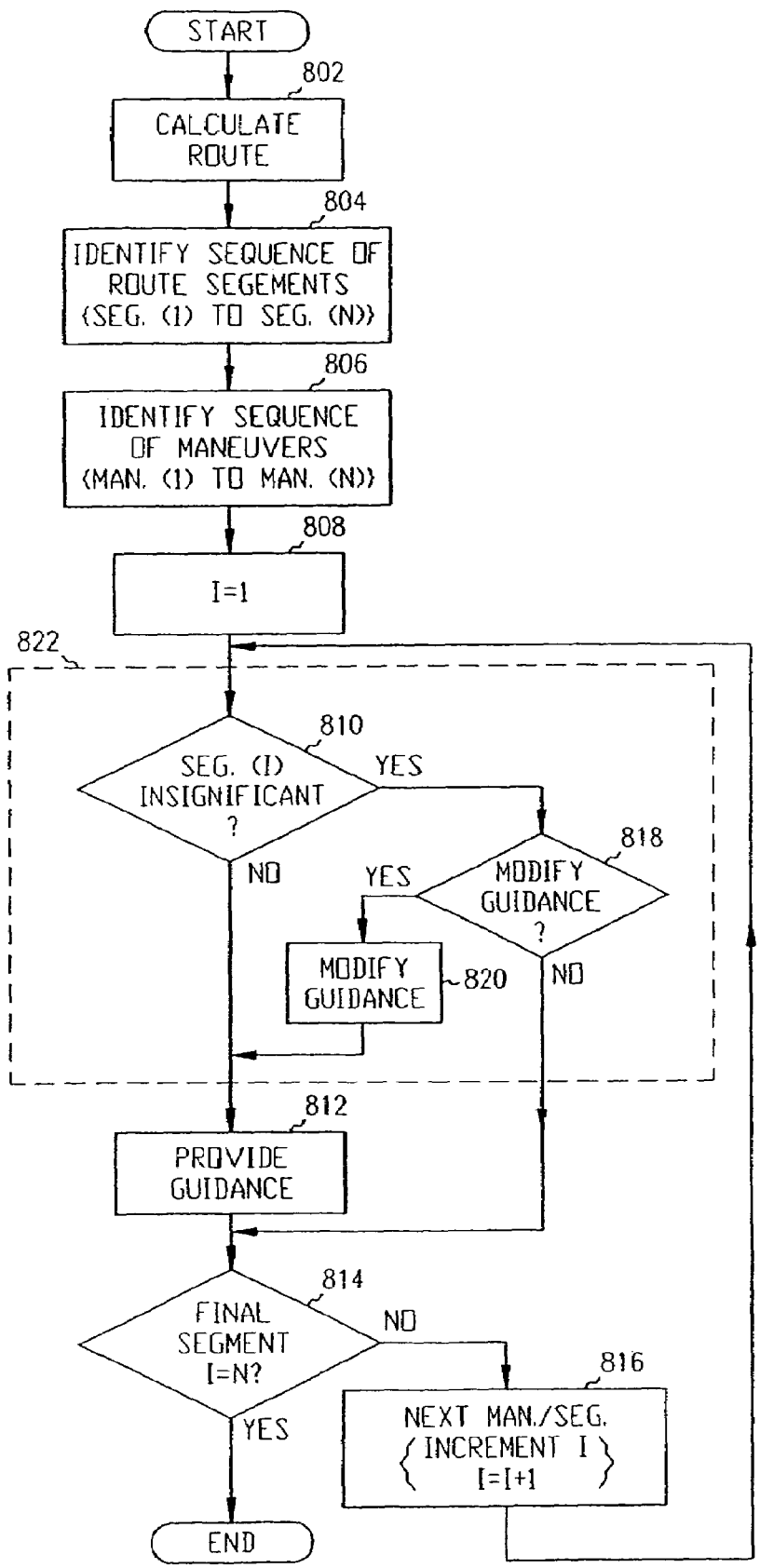
FIG. 8 is a flow diagram illustrating one embodiment of a route guidance process according to the present invention.

FIG. 8 is a flow diagram illustrating one embodiment of a route guidance process according to the present invention. The process illustrated in FIG. 8 adds steps 818 and 820 to the process illustrated in FIG. 7. Again, the process illustrated in FIG. 8 may be performed by the server 502 or by the navigation device 516 of FIG. 5.

According the process illustrated in FIG. 8, a route is calculated, determined or otherwise provided at 802. At 804, a sequence of route segments, i.e. SEG(1) to SEG(N), is identified for the route. At 806, a sequence of maneuvers, MAN(1) to MAN(N), is identified for the sequence of route segments. A counter variable "I" is set to one at 808. As will be illustrated below, this counter variable counts from one to N to evaluate each route guidance maneuver and each route segment in sequence.

It is determined at 810 whether segment SEG(L) is insignificant. Upon determining that segment SEG(I) is not insignificant (i.e., upon determining that segment SEG(I) is significant), the process proceeds to 812 where route guidance is explicitly provided for the route guidance maneuver MAN(I). If, at 810, it is determined that segment SEG(I) is insignificant, the process proceeds to 818, where it is determined whether to modify the route guidance maneuver MAN(I). Some factors used in making this determination were identified above with respect to FIG. 6. If it is determined to modify the route guidance maneuver MAN(I), the route guidance maneuver MAN(I) is modified at 820, and the process proceeds to 812 where route guidance is provided for the route guidance maneuver MAN(I). If, at 818, it is determined not to modify the route guidance maneuver MAN(I), then the process skips or nullifies the route guidance represented at 812. As provided above, according to one embodiment, skipping or nullifying the route guidance maneuver involves changing the maneuver to a Continue maneuver. As provided above, according to one embodiment, a user is not explicitly instructed to continue on a route.

The process proceeds to 814, where it is determined whether the final segment has been reached. That is, it is determined if the counter variable 1 equals N. If the final segment has not been reached, the process proceeds to 816, where the counter variable I is incremented (I=I+1) so as to evaluate the next route guidance maneuver and the next route guidance segment, and the process returns to 810. If the final segment has been reached, the process ends.

Figure 9:
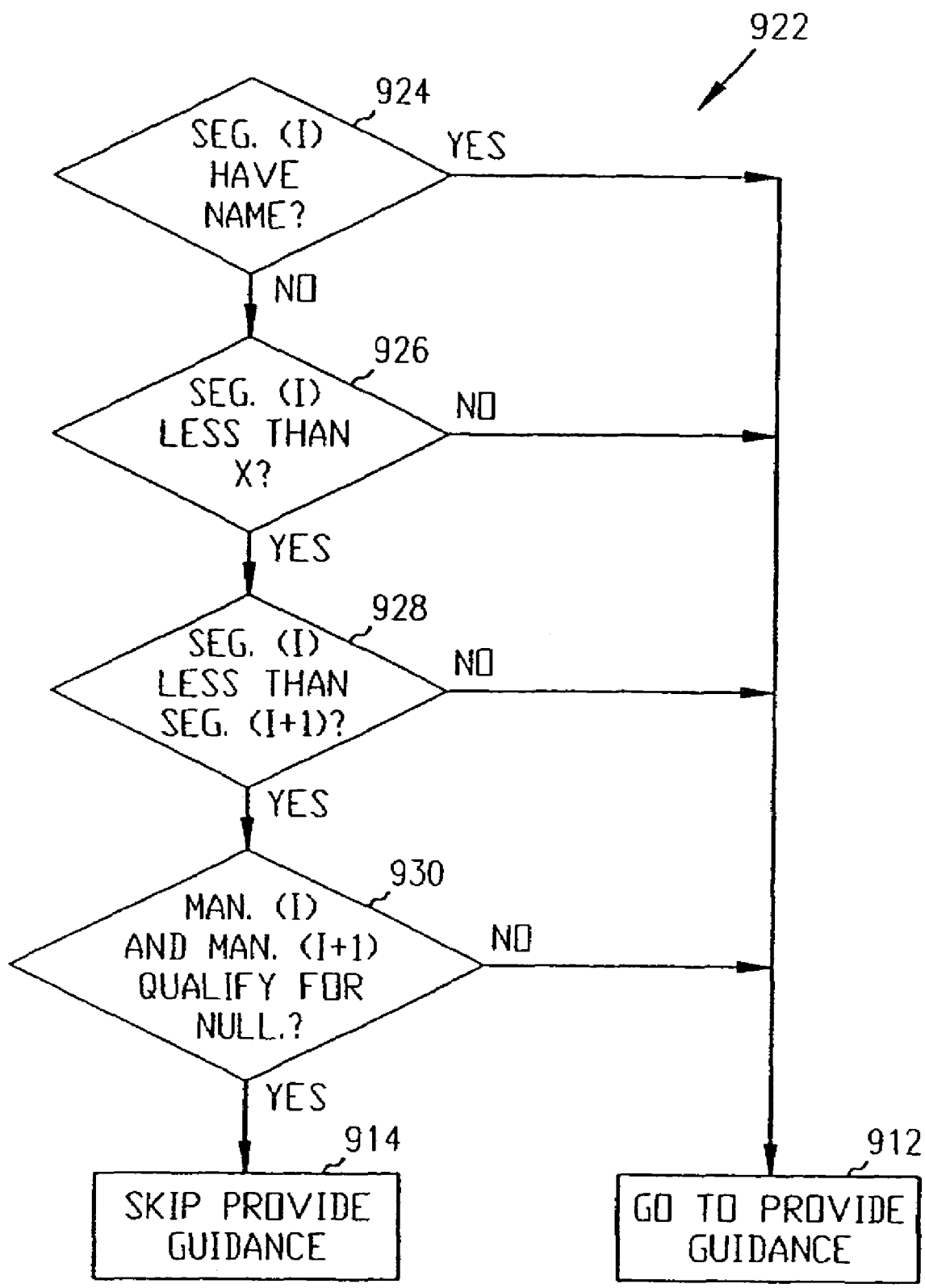
FIG. 9 is a flow diagram illustrating one embodiment for determining whether a segment is insignificant as shown in FIG. 7.

FIG. 9 is a flow diagram illustrating one embodiment for determining whether a segment is insignificant as shown in FIG. 7. The flow diagram of FIG. 9 is generally designated by the reference numeral 922, which generally corresponds to the area of the flow diagram of FIG. 7 designated by the reference numeral 722.

According to this embodiment for determining whether a segment is insignificant, it is determined whether segment SEG(I) has a name at 924. If it is determined that the segment SEG(I), has a name, the process proceeds to 912 to provide route guidance for the route guidance maneuver MAN(I), which is, for example, represented at 712 in FIG. 7.

At 926, it is determined whether segment SEG(I) has a length less that a predetermined length X. According to one embodiment, the predetermined length X is 100 meters. If it is determined that the segment SEG(D) does not have a length less than the predetermined length X, the process proceeds to 912 to provide route guidance for the route guidance maneuver MAN(I).

At 928, it is determined whether the length of segment SEG(I) is less than the length of a successive segment SEG(I+1). If it is determined that the length of segment SEG(I) is not less than the length of the successive segment SEG(I+1), the process proceeds to 912 to provide route guidance for the route guidance maneuver MAN(I).

At 930, it is determined whether the route guidance maneuver MAN(I) and a successive route guidance maneuver MAN(I+1) qualify for nullification. Some factors used in making this determination were identified above with respect to FIG. 6. If it is determined that the route guidance maneuvers MAN(I) and MAN(I+1) do not qualify, the process proceeds to 912 to provide route guidance for the route guidance maneuver MAN(I). The process proceeds to 914 to skip or nullify the route guidance, which is, for example, represented at 712 in FIG. 7. As provided above, according to one embodiment, skipping or nullifying the route guidance maneuver involves changing the maneuver to a Continue maneuver. As provided above, according to one embodiment, a user is not explicitly instructed to continue on a route.

As will be evident to one of ordinary skill in the art, the determinations designated by the reference numerals 924, 926, 928 and 930 do not have to be performed in a particular order, and the present invention is not so limited. Additionally, according to various embodiments, the process for determining whether a segment is insignificant includes any single or combination of the determinations designated by the reference numerals 924, 926, 928 and 930.

Figure 10:
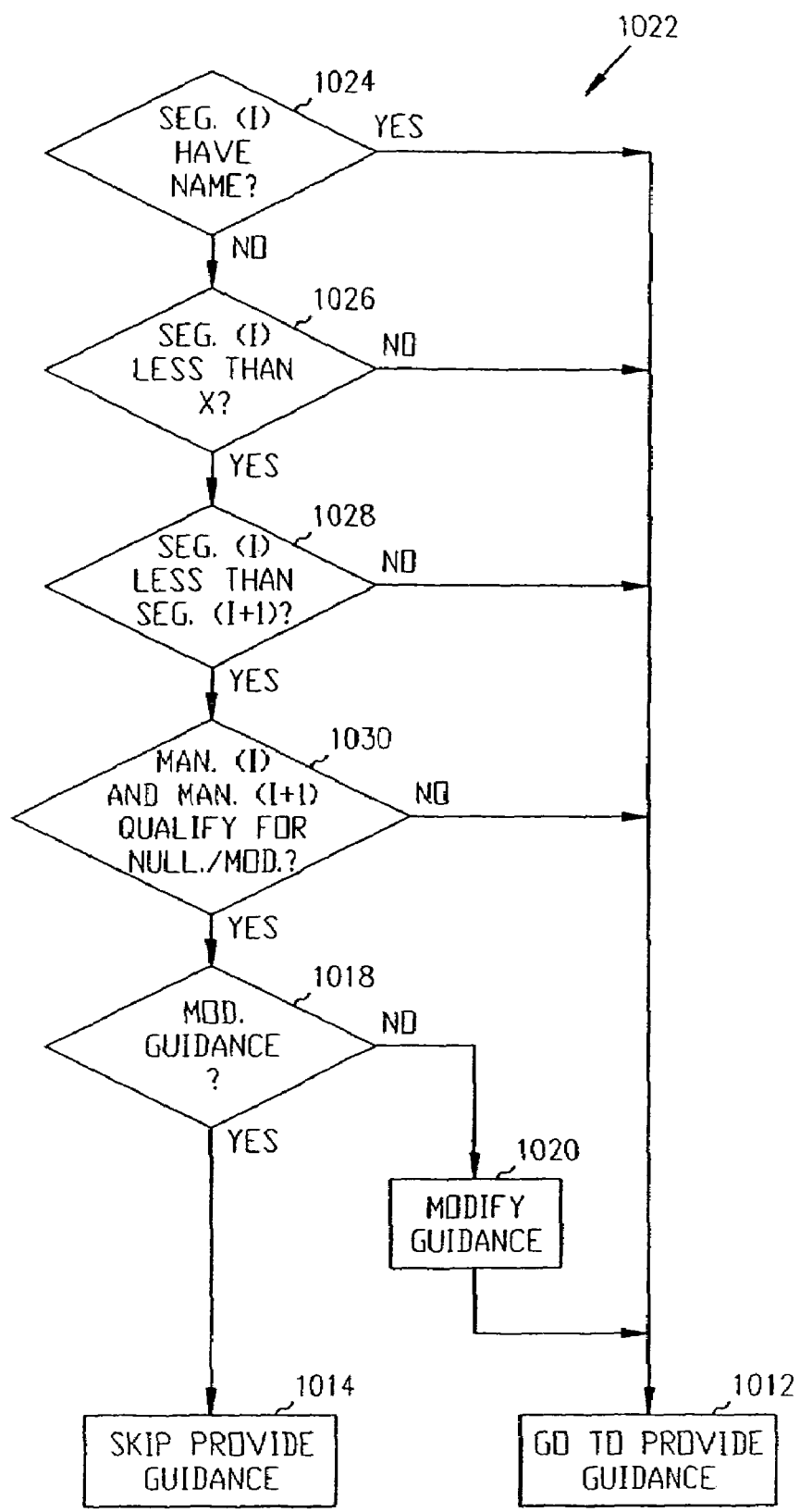
FIG. 10 is a flow diagram illustrating one embodiment for determining whether a segment is insignificant as shown in FIG. 8.

FIG. 10 is a flow diagram illustrating one embodiment for determining whether a segment is insignificant as shown in FIG. 8. The flow diagram of FIG. 10 is generally designated by the reference numeral 1022, which generally corresponds to the area of the flow diagram of FIG. 8 designated by the reference numeral 822.

According to this embodiment for determining whether a segment is insignificant, it is determined whether segment SEG(I) has a name at 1024. If it is determined that the segment SEG(I), has a name, the process proceeds to 1012 to provide route guidance for the route guidance maneuver MAN(I), which is, for example, represented at 812 in FIG. 8.

At 1026, it is determined whether segment SEG(I) has a length less that a predetermined length X. According to one embodiment, the predetermined length X is 100 meters. If it is determined that the segment SEG(I) does not have a length less than the predetermined length X, the process proceeds to 1012 to provide route guidance for the route guidance maneuver MAN(I).

At 1028, it is determined whether the length of segment SEG(I) is less than the length of a successive segment SEG(I+1). If it is determined that the length of segment SEG(I) is not less than the length of the successive segment SEG(I+1), the process proceeds to 1012 to provide route guidance for the route guidance maneuver MAN(I).

At 1030, it is determined whether the route guidance maneuver MAN(I) and a successive route guidance maneuver MAN(I+1) qualify for nullification. Some factors used in making this determination were identified above with respect to FIG. 6. The concept of determining whether two maneuvers qualify for nullification is discussed in more detail below. If it is determined that the route guidance maneuvers MAN(I) and MAN(I+1) do not qualify, the process proceeds to 1012 to provide route guidance for the route guidance maneuver MAN(I).

At 1018, which generally corresponds to the reference numeral 818 in FIG. 8, it is determined whether to modify the route guidance maneuver MAN(I). Some factors used in making this determination were identified above with respect to FIG. 6. If it is determined to modify the route guidance maneuver MAN(I), the route guidance maneuver MAN(I) is modified at 1020, and the process proceeds to 1012 where route guidance is provided for the route guidance maneuver MAN.(I). The process proceeds to 1014 to skip or nullify the route guidance, which is, for example, represented at 812 in FIG. 8. As provided above, according to one embodiment, skipping or nullifying the route guidance maneuver involves changing the maneuver to a Continue maneuver. As provided above, according to one embodiment, a user is not explicitly instructed to continue on a route.

As will be evident to one of ordinary skill in the art, the determinations designated by the reference numerals 1024, 1026, 1028, 1030 and 1018 do not have to be performed in a particular order, and the present invention is not so limited.

Additionally, according to various embodiments, the process for determining whether a segment is insignificant includes any single or combination of the determinations designated by the reference numerals 1024, 1026, 1028, 1030 and 1018.

In some embodiments, the methods illustrated in FIGS. 7-10 are implemented as a computer data signal embodied in a carrier wave that represents a sequence of instructions which, when executed by a processor such as processor 410 in FIG. 4A and processor 436 in FIG. 4B, cause the processor to perform the respective method. In other embodiments, these methods are implemented as a computer-accessible medium, such as memory 430 in FIG. 4A and memory 442 in FIG. 4B, having executable instructions capable of directing a processor, such as processor 410 in FIG. 4A and processor 436 in FIG. 4B, to perform the respective method. In varying embodiments, the medium is a magnetic medium, an electronic medium, or an optical medium.

As one of ordinary skill in the art will understand upon reading this disclosure, the electronic components of the device shown in FIGS. 4A and 4B and components of the system 500 shown in FIG. 5 can be embodied as computer hardware circuitry or as a computer-readable program, or a combination of both. In another embodiment, system 500 is implemented in an application service provider (ASP) system.

The system of the present invention includes software operative on a processor to perform methods according to the teachings of the present invention. One of ordinary skill in the art will understand, upon reading and comprehending this disclosure, the manner in which a software program can be launched from a computer readable medium in a computer based system to execute the functions defined in the software program. One of ordinary skill in the art will further understand the various programming languages which may be employed to create a software program designed to implement and perform the methods of the present invention. The programs can be structured in an object-orientation using an object-oriented language such as Java, Smalltalk or C++, and the programs can be structured in a procedural-orientation using a procedural language such as COBOL or C. The software components communicate in any of a number of means that are well-known to those skilled in the art, such as application program interfaces (A.P.I.) or interprocess communication techniques such as remote procedure call (R.P.C.), common object request broker architecture (CORBA), Component Object Model (COM), Distributed Component Object Model (DCOM), Distributed System Object Model (DSOM) and Remote Method Invocation (RMI). However, as will be appreciated by one of ordinary skill in the art upon reading this disclosure, the teachings of the present invention are not limited to a particular programming language or environment.

CONCLUSION

The above systems, devices and methods have been described, by way of example and not by way of limitation, with respect to improving route guidance by providing a feature that identifies insignificant route segments, or roads, in a planned route to provide clear and concise route guidance by appropriately accounting for the insignificant route segments. According to various embodiments, maneuvers associated with the insignificant route segments are nullified and/or modified as appropriate to provide clear and concise route guidance that enhances a route guidance experience.

Although specific embodiments have been illustrated and described herein, it will be appreciated by those of ordinary skill in the art that any arrangement which is calculated to achieve the same purpose may be substituted for the specific embodiment shown. This application is intended to cover any adaptations or variations of the present invention. It is to be understood that the above description is intended to be illustrative, and not restrictive. Combinations of the above embodiments, and other embodiments will be apparent to those of skill in the art upon reviewing the above description. The scope of the invention includes any other applications in which the above systems, devices and methods are used. The scope of the invention should be determined with reference to the appended claims, along with the full scope of equivalents to which such claims are entitled.

What is claimed is:

1. An electronic navigational aid device, comprising:
   a processor; and
   a memory adapted to communicate with the processor, wherein the processor and memory are adapted to cooperate to access a sequence of maneuvers associated with a sequence of route segments and provide route guidance that accounts for insignificant route segments, including route guidance that modifies a maneuver associated with an insignificant route segment.

2. The device of claim 1, wherein the electronic navigational aid device further comprises a portable electronic navigational aid device.

3. The device of claim 2, wherein the portable electronic navigational aid device includes a personal digital assistant (PDA).

4. The device of claim 2, wherein the portable electronic navigational aid device includes a wireless communications device.

5. The device of claim 1, further comprising a display adapted to communicate with the processor, wherein the display is adapted to provide a visual indication of the route guidance.

6. The device of claim 1, further comprising a speaker adapted to communicate with the processor, wherein the speaker is adapted to provide an audio indication of the route guidance.

7. The device of claim 1, wherein the route guidance that accounts for insignificant segments includes route guidance that nullifies a maneuver associated with an insignificant route segment.

8. A method, comprising:
   identifying a sequence of maneuvers associated with a sequence of route segments;
   determining whether a route segment in the sequence of route segments is significant or insignificant;
   upon determining that the route segment is significant, providing route guidance for a maneuver associated with the significant route segment; and
   upon determining that the route segment is insignificant, accounting for the insignificant route segment prior to providing route guidance for a maneuver associated with the insignificant route segment, wherein accounting for insignificant route segments includes nullifying the maneuver associated with some insignificant route segments and modifying the maneuver associated with other insignificant route segments.

9. The method of claim 8, wherein accounting for the insignificant route segment prior to providing route guidance for a maneuver associated with the insignificant route segment includes:

determining whether the maneuver associated with the insignificant route segment is to be modified;

upon determining that the maneuver associated with the insignificant route segment is to be modified, modifying the maneuver associated with the insignificant route segment; and upon determining that the maneuver associated with the insignificant route segment is not to be modified, nullifying the maneuver associated with the insignificant route segment.

10. The method of claim 8, wherein determining whether a route segment is significant or insignificant includes determining whether the route segment has a name.

11. The method of claim 8, wherein determining whether a route segment is significant or insignificant includes determining whether the route segment has a length less than a predetermined distance.

12. The method of claim 11, wherein determining whether the route segment has a length less than a predetermined distance includes determining whether the route segment has a length less than about 100 meters.

13. The method of claim 8, wherein determining whether a route segment is significant or insignificant includes determining whether the route segment has a length less than a length of a successive route segment.

14. The method of claim 8, wherein determining whether a route segment is significant or insignificant includes determining whether a route guidance maneuver for the route segment and a route guidance maneuver for a successive route segment qualify for nullification.

15. The method of claim 14, wherein:

determining whether a route guidance maneuver for the route segment and a route guidance maneuver for a successive route segment qualify for nullification includes determining whether the route guidance maneuver for the route segment and the route guidance maneuver for the successive route segment qualify for modification; and upon determining that the route guidance maneuver for the route segment and the route guidance maneuver for the successive route segment qualify for modification, modifying the route guidance maneuver for the route segment.

16. The method of claim 8, wherein determining whether a route segment is significant or insignificant includes:

determining whether the route segment has a name;

determining whether the route segment has a length less than a predetermined distance;

determining whether the route segment has a length less than a length of a successive route segment; and determining whether a route guidance maneuver for the route segment and a route guidance maneuver for a successive route segment qualify for nullification or modification.

17. The method of claim 8, wherein determining whether a route segment is significant or insignificant includes:

determining whether the route segment has a name;

upon determining that the route segment does not have a name, determining whether the route segment has a length less than a predetermined distance;

upon determining that the route segment has a length less than a predetermined distance, determining whether the route segment has a length less than a length of a successive route segment; and upon determining that the route segment has a length less than a length of a successive route segment, determining whether a route guidance maneuver for the route segment and a route guidance maneuver for a successive route segment qualify for nullification or modification.

18. A method, comprising:

accessing a sequence of maneuvers associated with a sequence of route segments;

determining whether a route segment from the sequence of route segments is significant or insignificant, including:

determining whether the route segment has a name;

determining whether the route segment has a length less than a predetermined distance;

determining whether the route segment has a length less than a length of a successive route segment; and determining whether a route guidance maneuver for the route segment and a route guidance maneuver for a successive route segment qualify for nullification or modification;

upon determining that the route segment is significant, providing route guidance for a maneuver associated with the significant route segment; and upon determining that the route segment is insignificant, accounting for the insignificant route segment prior to providing route guidance for a maneuver associated with the insignificant route segment, wherein accounting for the insignificant route segment includes modifying the maneuver associated with the insignificant route segment.

19. A method, comprising:

accessing a sequence of maneuvers associated with a sequence of route segments;

determining whether a route segment in the sequence of route segments is significant or insignificant, wherein determining whether a route segment is significant or insignificant includes:

determining whether the route segment has a name;

upon determining that the route segment does not have a name, determining whether the route segment has a length less than a predetermined distance;

upon determining that the route segment has a length less than a predetermined distance, determining whether the route segment has a length less than a length of a successive route segment; and upon determining that the route segment has a length less than a length of a successive route segment, determining whether a route guidance maneuver for the route segment and a route guidance maneuver for a successive route segment qualify for nullification or modification;

upon determining that the route segment is significant, providing route guidance for a maneuver associated with the significant route segment; and upon determining that a route segment is insignificant, accounting for the insignificant route segment prior to providing route guidance for a maneuver associated with the insignificant route segment, wherein accounting for the insignificant route segment includes modifying a first maneuver and nullifying a second maneuver associated with the insignificant route segment.

* * * * *